(12) United States Patent
Kamijo et al.

(10) Patent No.: US 8,222,860 B2
(45) Date of Patent: Jul. 17, 2012

(54) POWER TRANSMISSION CONTROL DEVICE, POWER TRANSMISSION DEVICE, POWER RECEIVING CONTROL DEVICE, POWER RECEIVING DEVICE, AND ELECTRONIC APPARATUS

(75) Inventors: Takahiro Kamijo, Fujimi-cho (JP); Yoichiro Kondo, Chino (JP); Kota Onishi, Nagoya (JP); Masayuki Kamiyama, Nagoya (JP); Nobutaka Shiozaki, Nagoya (JP)

(73) Assignee: Seiko Epson Corporation, Tokyo (JP)

( * ) Notice: Subject to any disclaimer, the term of this patent is extended or adjusted under 35 U.S.C. 154(b) by 438 days.

(21) Appl. No.: 12/489,912

(22) Filed: Jun. 23, 2009

(65) Prior Publication Data

US 2009/0322280 A1 Dec. 31, 2009

(30) Foreign Application Priority Data

Jun. 25, 2008 (JP) ................. 2008-165988

(51) Int. Cl.
*H02J 7/00* (2006.01)
*H04B 1/00* (2006.01)
*H04M 1/00* (2006.01)
*H02H 3/00* (2006.01)

(52) U.S. Cl. ........ 320/108; 320/106; 320/109; 320/115; 320/139; 455/69; 455/437; 379/443; 379/74; 361/82

(58) Field of Classification Search .................. 320/108
See application file for complete search history.

(56) References Cited

U.S. PATENT DOCUMENTS

| | | | | |
|---|---|---|---|---|
| 5,455,466 | A * | 10/1995 | Parks et al. | 307/104 |
| 6,016,046 | A * | 1/2000 | Kaite et al. | 320/108 |
| 7,109,682 | B2 * | 9/2006 | Takagi et al. | 320/108 |
| 7,554,316 | B2 | 6/2009 | Stevens et al. | |
| 7,605,496 | B2 | 10/2009 | Stevens et al. | |
| 2002/0089305 | A1* | 7/2002 | Park et al. | 320/108 |
| 2003/0052645 | A1* | 3/2003 | Sasaki | 320/110 |
| 2005/0134213 | A1* | 6/2005 | Takagi et al. | 320/108 |
| 2009/0134713 | A1 | 5/2009 | Stevens et al. | |
| 2009/0322158 | A1 | 12/2009 | Stevens et al. | |

FOREIGN PATENT DOCUMENTS

| | | |
|---|---|---|
| JP | A-10-94199 | 4/1998 |
| JP | A-2006-60909 | 3/2006 |
| JP | A-2007-537688 | 12/2007 |
| WO | WO 2005/109597 A1 | 11/2005 |

* cited by examiner

*Primary Examiner* — Yalkew Fantu
(74) *Attorney, Agent, or Firm* — Oliff & Berridge, PLC

(57) ABSTRACT

A power transmission control device included in a contactless power transmission system in which power is transmitted from a power transmission device to a power receiving device by electromagnetically coupling a primary coil and a secondary coil and the power is supplied to a load of the power receiving device, includes a controller controlling the power transmission control device, and a load condition detection circuit detecting a load condition on a power receiving side. The controller determines the load condition on the power receiving side based on threshold information received from the power receiving device and load condition detection information from the load condition detection circuit.

15 Claims, 16 Drawing Sheets

FIG. 8A

NEGOTIATION FRAME

| BEGINNING FIELD | INFORMATION FIELD | | FINAL FIELD |
|---|---|---|---|
| | HARDWARE INFORMATION CODE | MATCHING CODE | |

FIG. 8B

MATCHING CODE

| COMMAND ID | COIL CODE (CLASSIFICATION CODE, COIL ID) | EXTENSION CODE | STANDARD CODE |
|---|---|---|---|

FIG. 8C

HARDWARE INFORMATION CODE

| HARDWARE INFORMATION | |
|---|---|
| THRESHOLD OF FOREIGN OBJECT | SYSTEM CODE (SYSTEM INFORMATION) |

POWER TRANSMISSION CONTROL DEVICE, POWER TRANSMISSION DEVICE, POWER RECEIVING CONTROL DEVICE, POWER RECEIVING DEVICE, AND ELECTRONIC APPARATUS

This application claims priority to JP 2008-165988 filed in Japan on Jun. 25, 2008, the entire disclosures of which is hereby incorporated by reference in its entirety.

BACKGROUND

1. Technical Field

The present invention relates to a power transmission control device, a power transmission device, a power receiving control device, a power receiving device, and an electronic apparatus.

2. Related Art

In recent years, contactless power transmission (non-contact power transmission) has been highlighted. The contactless power transmission makes it possible to perform transmission of electric power by utilizing electromagnetic induction without using a metallic contact. As an example of the contactless power transmission, charging cell phones and household equipment (e.g., cordless handsets of telephones) are suggested.

JP-A-2006-60909 is a first example of related art of the contactless power transmission. In the first example, an ID authentication is realized by transmitting and receiving an authentication code between a power receiving device (a secondary side) and a power transmission device (a primary side) so as to detect insertion of a foreign object or the like. JP-A-10-94199 is a second example of related art. In the second example, a power supply control system is disclosed in which in order to prevent a circuit breaker from tripping in a case where electrical appliances are simultaneously used at home, power usage information of the electrical appliances is gathered so as to determine whether or not power can be supplied within an acceptable range, thereby providing power to a specific electrical appliance determined that power can be supplied to it.

The related art disclosed in the second example, however, is only on the assumption that a single power transmission device corresponds to a single power receiving device. The power transmission device, thus, determines only whether or not a device ID received from the power receiving device is appropriate. Therefore, in a case where a plurality of the power receiving device is mixedly provided, appropriate contactless power transmission cannot be realized.

SUMMARY

An advantage of the invention is to provide a power transmitting control device, a power transmission device, a power receiving control device, a power receiving device, and an electronic apparatus that realize proper contactless power transmission.

According to a first aspect of the invention, a power transmission control device is provided in a power transmission device included in a contactless power transmission system in which power is transmitted from the power transmission device to a power receiving device by electromagnetically coupling a primary coil and a secondary coil and the power is supplied to a load of the power receiving device. The power transmission control device includes a controller controlling the power transmission control device and a load condition detection circuit detecting a load condition on a power receiving side. The controller determines the load condition on the power receiving side based on threshold information received from the power receiving device and load condition detection information from the load condition detection circuit.

According to the first aspect of the invention, the power receiving device transmits the threshold information for detecting the load condition on the power receiving side. Upon receiving the threshold information, the power transmission side determines the load condition on the power receiving side based on the received threshold information and the load condition detection information from the load condition detection circuit. Since the load condition on the power receiving side is determined by using the threshold information received from the power receiving side as described above, proper contactless power transmission can be realized. In addition, the load condition on the power receiving side can be properly determined even if the primary side and the secondary side are combined in various ways.

In the device, the controller may detect a foreign object based on the threshold information and the load condition detection information.

This structure makes it possible to confirm that any foreign object is not inserted by the foreign object detection using the threshold information received from the power receiving side. As a result, more proper contactless power transmission can be realized.

The device may further include a storing section storing power transmission side system information showing a load condition detection method that the power transmission device is able to cope with. The power receiving device may transmit power receiving side system information showing a load condition detection method that the power receiving device is able to cope with to the power transmission device. The controller may collate the power transmission side system information stored in the storing section and the power receiving side system information received from the power receiving device, and may determine whether or not the power transmission side system information and the power receiving side system information are compatible.

In the device, upon receiving the power receiving side system information from the power receiving device, the controller collates the power transmission side system information stored in the storing section and the received power receiving side system information received, and determines whether or not the power transmission side system information and the power receiving side system information are compatible. This structure makes it possible to execute various processes based on the collation result of the power transmission side system information and the power receiving side system information. In addition, both the system information on the power transmission side and the power receiving side as well as the threshold information can be collated in sets. As a result, more proper contactless power transmission can be realized.

In the device, the controller may transmit the power transmission side system information to the power receiving device if determining that the power transmission side system information and the power receiving side system information are compatible.

This structure enables the power receiving side to confirm the power transmission side system information from the power transmission side so as to perform the collation process and the like.

In the device, the controller may detect the foreign object before transmitting the power transmission side system information to the power receiving device, and transmit the power transmission side system information to the power receiving device if the foreign object is not detected.

Since the foreign object detection is performed in transmitting and receiving the system information, more proper power transmission can be realized.

In the device, the storing section may store a plurality of pieces of the power transmission side system information showing, in a plurality of numbers, the load condition detection method that the power transmission device is able to cope with, and transmit system information compatible with the power receiving side system information out of the plurality of pieces of the power transmission side system information.

Accordingly, variations in matching the system information on the primary side and that of the secondary side can be increased, whereby a flexible system can be provided.

In the device, the controller may collate the power transmission side system information and the power receiving side system information before starting normal power transmission from the power transmission device to the power receiving device, and start the normal power transmission if determining that the power transmission side system information and the power receiving side system information are compatible.

This structure can prevent normal power transmission from being performed under the condition in which both the system information are not compatible. As a result, more proper contactless power transmission can be realized.

According to a second aspect of the invention, a power transmission device includes the power transmission control device of the first aspect, and a power transmission section that generates an alternating-current voltage so as to supply it to the primary coil.

According to a third aspect of the invention, an electronic apparatus includes the power transmission device of the second aspect.

According to a fourth aspect of the invention, a power receiving control device is provided in a power receiving device included in a contactless power transmission system in which power is transmitted from a power transmission device to the power receiving device by electromagnetically coupling a primary coil and a secondary coil and the power is supplied to a load of the power receiving device. The power receiving control device includes a controller controlling the power receiving control device and a storing section storing threshold information. The controller transmits the threshold information stored in the storing section to the power transmission device.

According to the fourth aspect of the invention, the threshold information for detecting the load condition on the power receiving side is stored in the storing section, and the stored threshold information is transmitted to the power transmission device. Accordingly, the power transmission side can determine the load condition on the power receiving side based on the received threshold information. As a result, proper contactless power transmission can be realized. In addition, the load condition on the power receiving side can be properly determined even if the primary side and the secondary side are combined in various ways.

In the device, the storing section may store power receiving side system information showing a load condition detection method that the power receiving device is able to cope with, and the controller may transmit the power receiving side system information to the power transmission device.

In the device, the power receiving side system information is stored in the storing section and the stored power receiving side system information is transmitted to the power transmission device. This structure enables the transmission side to perform various process based on the received power receiving side system information. In addition, both the system information on the power transmission side and the power receiving side as well as the threshold information can be collated in sets. As a result, more proper contactless power transmission can be realized.

In the device, the power transmission device having received the power receiving side system information may transmit power transmission side system information to the power receiving device. The controller may collate the power transmission side system information and the power receiving side system information upon receiving the power transmission side system information, and determine whether or not the power transmission side system information and the power receiving side system information are compatible.

This structure makes it possible to execute various processes based on the collation result of the power transmission side system information and the power receiving side system information. As a result, more proper contactless power transmission can be realized.

In the device, the storing section may store a plurality of pieces of the power receiving side system information showing, in a plurality of numbers, the load condition detection method that the power receiving device is able to cope with, and the controller may transmit the plurality of pieces of the power receiving side system information to the power transmission device.

Accordingly, variations in matching the system information on the primary side and that of the secondary side can be increased, whereby a flexible system can be provided.

In the device, the controller may determine whether or not a positional relation between the primary coil and the secondary coil is appropriate, and transmit the threshold information to the power transmission device if determining that the positional relation is appropriate.

Since the power receiving side system information is transmitted to the power transmission side under the condition that the positional relation between the primary coil and the secondary coil is appropriate, it can be prevented that the collation process on the system information is uselessly performed on the power transmission side.

In the device, the controller may transmit the threshold information to the power transmission device before starting normal power transmission from the power transmission device to the power receiving device.

This structure can prevent normal power transmission from being performed under the condition in which the compatibility of the system information is not confirmed on the power transmission side. As a result, more proper contactless power transmission can be realized.

In the device, the controller may transmit the threshold information and the power receiving side system information showing the load condition detection method that the power receiving device is able to cope with to the power transmission device before starting the normal power transmission.

As a result, the normal power transmission is started after collating the threshold information as well as the system information on both the power transmission side and receiving side in sets.

According to a fifth aspect of the invention, a power receiving device includes the power receiving control device of the fourth aspect, and a power receiving section that converts an induced voltage in the secondary coil into a direct-current voltage.

According to a sixth aspect of the invention, an electronic apparatus includes the power receiving device of the fifth aspect; and a load to which power is supplied by the power receiving device.

BRIEF DESCRIPTION OF THE DRAWINGS

The invention will be described with reference to the accompanying drawings, wherein like numbers reference like elements.

FIGS. 8A, 8B, and 8C are format examples of a negotiation frame.

DESCRIPTION OF EXEMPLARY EMBODIMENT

An Embodiment of the invention will be described in detail below. The embodiment explained below does not unduly limit the contents of the invention described in the claims and all of the structures explained in the embodiment are not indispensable for the solving means of the invention.

1. Electronic Apparatus

Figure 1A:
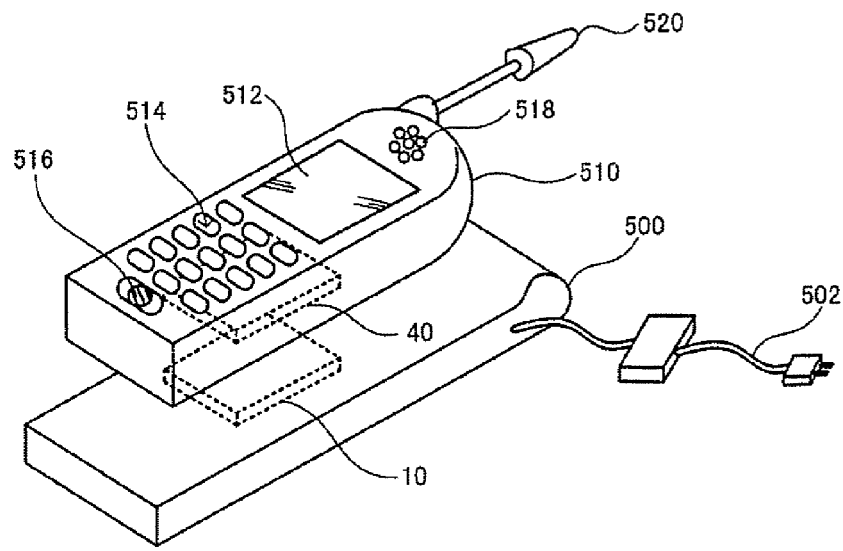
FIGS. 1A, 1B, and 1C are schematic views explaining contactless power transmission.

FIG. 1A shows an example of an electronic apparatus employing a contactless power transmission method according to an embodiment of the invention. A charger 500 (a cradle) that is one of electronic apparatuses includes a power transmission device 10. A cell phone 510 that is one of electronic apparatuses includes a power receiving device 40. The cell phone 510 includes a display 512 such as an LCD, an operation section 514 composed of buttons and the like, a microphone 516 (a voice input section), a speaker 518 (a voice output section), and an antenna 520.

Power is supplied to the charger 500 through an AC adapter 502, and the power is transmitted from the power transmission device 10 to the power receiving device 40 by contactless power transmission. Accordingly, a battery of the cell phone 510 can be charged and devices in the cell phone 510 can be operated.

The electronic apparatus according to the embodiment is not limited to the cell phone 510. The embodiment is applicable to various electronic apparatuses such as watches, cordless phones, shavers, electric toothbrushes, wrist computers, handy terminals, personal digital assistants, electric bicycles, and IC cards.

Figure 1B:
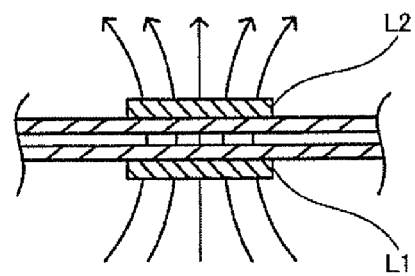

As schematically shown in FIG. 1B, power is transmitted from the power transmission device 10 to the power receiving device 40 by electromagnetically coupling a primary coil L1 (a power transmission coil) included in the power transmission device 10 and a secondary coil L2 (a power receiving coil) included in the power receiving device 40 and thus forming a power transmission transformer. This realizes contactless power transmission.

In FIG. 1B, the primary coil L1 and the secondary coil L2 are, for example, a flat coil having an air-core formed by winding a coil wire in a spiral manner on a plane. The coil of the embodiment is not limited to this. Any shape, structure, and the like of the coil can be employed as long as one can transmit power by electromagnetically coupling the primary coil L1 and the secondary coil L2.

Figure 1C:
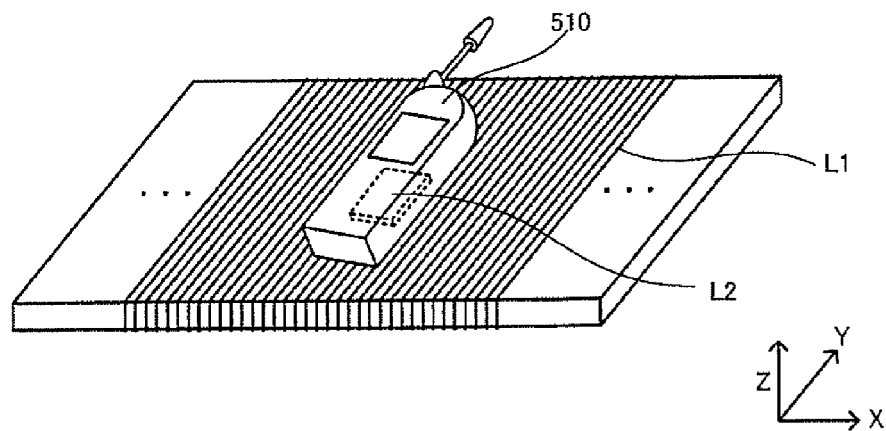

For example, in FIG. 1C, the primary coil L1 is formed by winding a coil wire in a spiral manner about an X axis with respect to a magnetic substance core. The secondary coil L2 provided in the cell phone 510 is similarly formed. The embodiment is also applicable to the coil shown in FIG. 1C. Further, in FIG. 1C, as the primary coil L1 and the secondary coil L2, in addition to the coil formed by winding the coil wire about the X axis, a coil formed by winding the coil wire about a Y axis may be used in combination.

2. Power Transmission Device and Power Receiving Device

Figure 2:
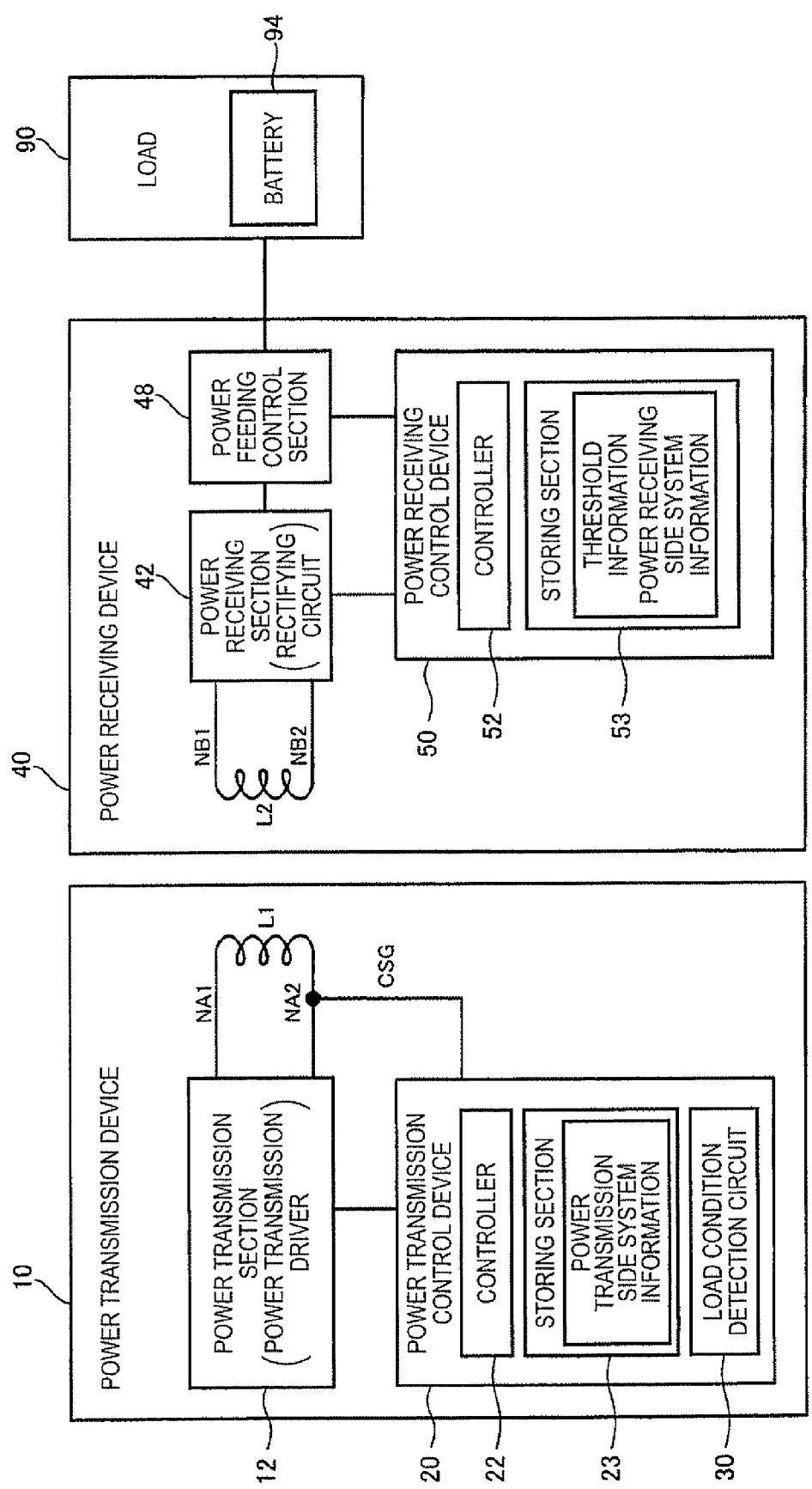
FIG. 2 is a structural example of a power transmission device, a power transmission control device, a power receiving device, and a power receiving control device according to an embodiment.

FIG. 2 shows a structural example of the power transmission device 10, a power transmission control device 20, the power receiving device 40, and a power receiving control device 50 according to the embodiment. The electronic apparatus, such as the charger 500 shown in FIG. 1A, used on a power transmission side includes the power transmission device 10 shown in FIG. 2. The electronic apparatus, such as the cell phone 510, used on a power receiving side may include the power receiving device 40 and a load 90 (main load). Based on a structure shown in FIG. 2, a contactless power transmission (non-contact power transmission) system is realized in which the primary coil L1 and the secondary coil L2 are electromagnetically coupled so as to transmit power from the power transmission device 10 to the power receiving device 40 to supply the power to the load 90, for example.

The power transmission device 10 (a power transmission module, a primary module) may include the primary coil L1, a power transmission section 12, and the power transmission control device 20. The structures of the power transmission device 10 and the power transmission control device 20 are not limited to those shown in FIG. 2, and various modifications, such as omitting a part of components (e.g., the primary coil), adding another component (e.g., a waveform monitor circuit), and changing connections, can be made.

The power transmission section 12 generates an alternating-current (AC) voltage, and supplies it to the primary coil L1. Specifically, the power transmission section 12 generates an AC voltage having a predetermined frequency at transmitting power while generates AC voltages having different frequencies corresponding to data at transmitting the data, thereby supplying them to the primary coil L1. The power transmission section 12 may include, for example, a first power transmission driver for driving one end of the primary coil L1, a second power transmission driver for driving the other end of the primary coil L1, and at least one capacitor forming a resonance circuit together with the primary coil L1. Each of the first and the second power transmission drivers included in the power transmission section 12 is an inverter circuit (a buffer circuit) composed of, for example, a power MOS transistor, and is controlled by the power transmission control device 20.

The primary coil L1 (a coil used on the power transmission side) and the secondary coil L2 (a coil used on the power receiving side) are electromagnetically coupled so as to form a power transmission transformer. For example, when the power transmission is required, as shown in FIGS. 1A and 1B, the cell phone 510 is placed on the charger 500 so that magnetic flux of the primary coil L1 passes through the secondary coil L2. On the other hand, when the power transmission is not required, the cell phone 510 is physically separated from the charger 500 so that magnetic flux of the primary coil L1 does not pass through the secondary coil L2.

The power transmission control device 20 performs various controls of the power transmission device 10, and can be realized by an integrated circuit (IC) device and the like. The power transmission control device 20 may include a controller 22, a storing section 23, and a load condition detection circuit 30. In this regard, modifications such as omitting a part of the components and adding another component can be made.

The controller 22 (on the power transmission side) controls the power transmission device 10 and the power transmission control device 20. The controller 22 can be realized by an ASIC circuit such as a gate array, a micro computer with a program operating on the micro computer, and the like. The controller 22 controls power transmission by using the power transmission section 22, storage of the storing section 23, and the load condition detection circuit 30. Specifically, the controller 22 controls various sequences and performs a determination process required for power transmission, load condition detection (data detection, foreign object detection, removal detection, and the like), a frequency modulation, and the like.

The storing section 23 (a register) stores various information, and can be realized by, for example, a RAM, a D flip-flop, or a nonvolatile memory such as a flush memory and a mask ROM.

The load condition detection circuit 30 (a waveform detection circuit) detects a load condition of the power receiving side (the power receiving device or foreign objects). The load condition detection can be realized by detecting changes in the waveform of an induced voltage signal (a coil terminal signal) of the primary coil L1. For example, a variation of a load condition (a load current) on the power receiving side (the secondary side) induces a variation in the waveform of the induced voltage signal. The load condition detection circuit 30 detects the variation of the waveform, and outputs a detection result (detection result information) to the controller 22. Then, the controller 22, based on the detection information of the load condition of the load condition detection circuit 30, determines the load condition (load fluctuation, a degree of the load) of the power receiving side (the secondary side).

The power receiving device 40 (a power receiving module, a secondary module) may include the secondary coil L2, a power receiving section 42, a power feeding control section 48, and the power receiving control device 50. The structures of the power receiving device 40 and the power receiving control device 50 are not limited to those shown in FIG. 2, and various modifications, such as omitting a part of components (e.g., the secondary coil), adding another component (e.g., a load modulation section), and changing connections, can be made.

The power receiving section 42 converts an alternating induced voltage of the secondary coil L2 into a direct-current voltage. The conversion can be realized by a rectifying circuit and the like included in the power receiving section 42.

The power feeding control section 48 controls power feeding to the load 90. That is, the power feeding control section 48 controls turning on/off the power feeding to the load 90. Specifically, a level of the direct-current voltage from the power receiving section 42 (the rectifying circuit) is adjusted so as to generate a power supply voltage. Thereafter, the power supply voltage is supplied to the load 90 so as to charge a battery 94 of the load 90. The load 90 may not include the battery 94.

The power receiving control device 50 performs various controls of the power receiving device 40, and can be realized by an integrated circuit (IC) device and the like. The power receiving control device 50 operates with a power supply voltage generated from the induced voltage of the secondary coil L2. The power receiving control device 50 may include a controller 52 and a storing section 53.

The controller 52 (on the power receiving side) controls the power receiving device 40 and the power receiving control device 50. The controller 52 can be realized by an ASIC circuit such as a gate array, a micro computer with a program operating on the micro computer, and the like. The controller 52 controls the power feeding control section 48 and storage of the storing section 53. Specifically, the controller 52 controls various sequences and performs a determination process required for position detection, frequency detection, a load modulation, full charge detection, and the like.

The storing section 53 (a register) stores various information, and can be realized by, for example, a RAM, a D flip-flop, or a nonvolatile memory such as a flush memory and a mask ROM.

In the embodiment, the storing section 23, on the power transmission side, stores power transmission side system information. The storing section 53 on the power receiving side stores threshold value information and power receiving side system information. The controller 52, on the power receiving side, transmits threshold information and power receiving side system information that are stored in the storing section 53 to the power transmission device 10 by using, for example, contactless power transmission. Specifically, the positional relation between the primary coil L1 and the secondary coil L2 is determined whether or not it is appropriate, for example. If the positional relation (positional level) is determined as appropriate, the threshold information and the power receiving side system information are transmitted to the power transmission device 10.

The controller 22, on the power transmission side, determines the load condition of the power receiving side based on the threshold information received from the power receiving device 40 and the load condition detection information (e.g., a count value of a pulse width or a peak voltage value) from the load condition detection circuit 30. For example, the controller 22 compares the threshold level of the threshold information and the load condition detection level of the load condition detection information, and determines whether or not the load condition of the power receiving side is appropriate. Specifically, foreign object detection (e.g., first foreign object detection before starting normal power transmission) and the like is performed based on the threshold information and the load condition detection information.

The controller 22 also performs a collation process to collate power transmission side information stored in the storing section 23 and power receiving side information received from the power receiving device 40. Thereafter, the controller 22 determines whether or not the power transmission side information is compatible with (e.g., is matched) the power receiving side information.

Specifically, the storing section 23, on the power transmission side, stores power transmission side system information showing a load condition detection method with which the power transmission device 10 can cope. On the other hand, the storing section 53, on the power receiving side, stores power receiving side system information showing a load condition detection system with which the power receiving device 40 can cope. Then, the power receiving device 40 transmits power receiving side system information showing the load condition detection method with which the power receiving device 40 can cope to the power transmission device 10. The controller 22, on the power transmission side, performs a collation process to collate the power transmission side system information stored in the storing section 23 and the power receiving side system information received from the power receiving device 40, and determines whether or not the power transmission side system information is compatible with (matched to) the power receiving side system information.

Determining that the power transmission side system information is matched with the power receiving side system information, the controller 22, on the power transmission side, transmits the power transmission side system information stored in the storing section 23 to the power receiving device 40. Specifically, the controller 22 performs foreign object detection (first foreign object detection) before transmitting the power transmission side system information to the power receiving device 40. If no foreign objects are detected, the controller 22 transmits the power transmission side system information to the power receiving device 40.

The storing section 23 may store a plurality of pieces of power transmission side system information showing a plurality of load condition detection methods with which the power transmission device 10 can cope. In this case, the controller 22 transmits system information matching the power receiving side system information out of the plurality of pieces of power transmission side system information to the power receiving device 40. For example, if power receiving side system information received from the power receiving device 40 is not compatible with (matched to) k-th power transmission side system information in first to M-th power transmission side system information, the controller 22 retrieves system information matching the power receiving side system information out of the first to M-th power transmission side system information, thereby transmitting the retrieved system information to the power receiving device 40, Upon receiving the power transmission side system information, the controller 52, on the power receiving side, performs a collation process (matching determination) to collate the power transmission side system information and the power receiving side system information, and determines whether nor not the power transmission side system information and the power receiving side system information are compatible (matched).

The storing section 53, on the power receiving side, may store a plurality of pieces of power receiving side system information showing a plurality of load condition detection methods with which the power transmission device 40 can cope. The controller 52 transmits the plurality of pieces of power receiving side system information (first to L-th power receiving side system information) to the power transmission device 10. The controller 22, on the power transmission side, retrieves system information matching the power transmission side system information out of the plurality of pieces of power receiving side system information, thereby performing a collation process to collate the system information of the power transmission side and the power receiving side.

The controller 52, on the power receiving side, transmits the power receiving side system information to the power transmission device 10 before starting normal power transmission (full-scale transmission) from the power transmission device 10 to the power receiving device 40. For example, threshold information and power receiving side system information are transmitted as a set before starting the normal power transmission. The controller 22, on the power transmission side, performs the collation process to collate the power transmission side system information and the power receiving side system information before starting the normal power transmission, thereby starting the normal power transmission under the condition that the power transmission side system information and the power receiving side system information are determined as being matched.

3. Transmitting Threshold Information and System Information

As contactless power transmission is widely used, it is expected that various types of secondary coils for the power receiving side are available in markets. That is, since electric apparatuses, such as cell phones, serving as the power receiving side have a wide variety of shapes and sizes, secondary coils installed in the power receiving devices of the electric apparatuses also have a wide variety of shapes and sizes. In addition, electronic apparatuses need a wide variety of electrical energy (wattages) and output voltages for contactless power transmission. As a result, the secondary coils have a wide variety of inductances and the like.

On the other hand, in contactless power transmission, power can be transmitted even if the shapes and the sizes of the primary coil and the secondary coil are not completely matched. In this regard, in a charge using a wired cable, such case can be prevented by devising a shape and the like of cable connectors. However, in contactless power transmission, such device is hard to be made.

In this case, as disclosed in the first example of related art, there may be a method of comparison example in which a device ID of a power receiving device is transmitted to a power transmission device so that the power transmission device authenticates ID by using the device ID.

The method of the comparison example is on the assumption that a single power transmission device corresponds to a single power receiving device, and is not on the assumption that a plurality of secondary coils corresponds to a single primary coil, Accordingly, if various types of secondary coils are available in markets, it is hard to cope with them. That is, if the single primary coil needs to cope with the plurality of the secondary coils, the power transmission side has to store a plurality of device IDs. Therefore, cumbersome management is required.

When the plurality of second coils corresponds to the single primary coil, the electromagnetic coupling conditions differ depending on the combinations. Accordingly, threshold for detecting the load condition of the power receiving side is also changed depending on the combinations of the primary coil and the secondary coil. As a result, it is difficult to properly determine the load condition of the power receiving side.

As an alternative, a method can be employed in which threshold information is managed on the power transmission side. In the method, however, the power transmission side has to manage threshold information corresponding to all the secondary coils, thereby causing problems in that cumbersome management is required and available memory capacity of the storing section on the power transmission side is reduced.

Figure 3A:
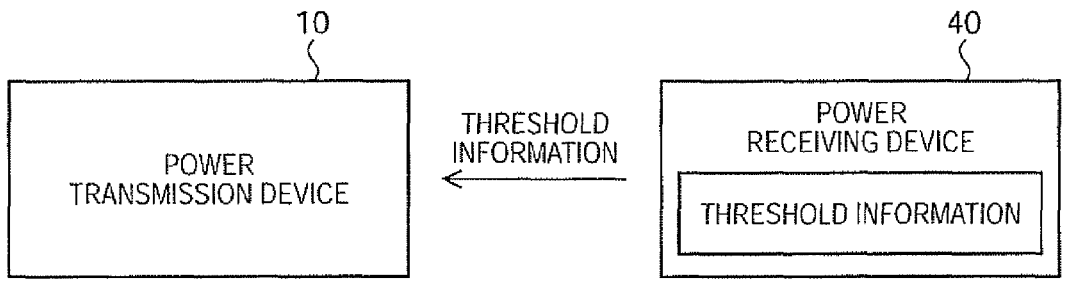
FIGS. 3A, 3B, 3C and 3D are explanatory views of methods according to the embodiment for transmitting threshold information and system information from a power receiving side to a power transmission side.
Figure 3B:
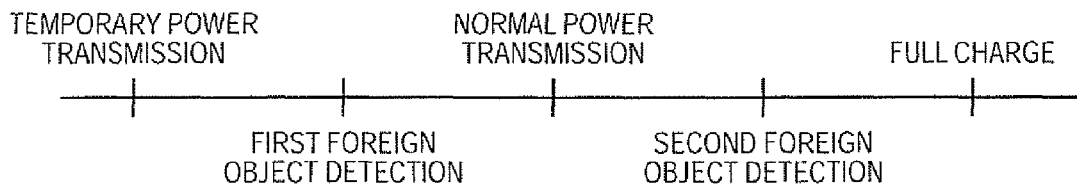

In the embodiment, as shown in FIG. 3A, the power receiving device 40 stores threshold information for detecting a load condition of the power receiving side, and transmits the threshold information to the power transmission device 10. The power transmission device 10 determines the load condition of the power receiving side based on the threshold information received from the power receiving device 40 and the load condition detection information from the load condition detection circuit 30. Specifically, as shown in FIG. 3B, the power transmission device 10 performs first foreign object detection before starting the normal power transmission based on the received threshold information and the load condition detection information, for example. As a result, the safety of the contactless power transmission can be enhanced since it can be determined, by using the received threshold information before starting the normal power transmission, whether or not any foreign objects are inserted between the power transmission device 10 and the power receiving device 40 based on the proper threshold information. Second foreign object detection, which is foreign object detection after starting the normal power transmission, can be performed by using the threshold information received from the power receiving side.

Figure 3C:
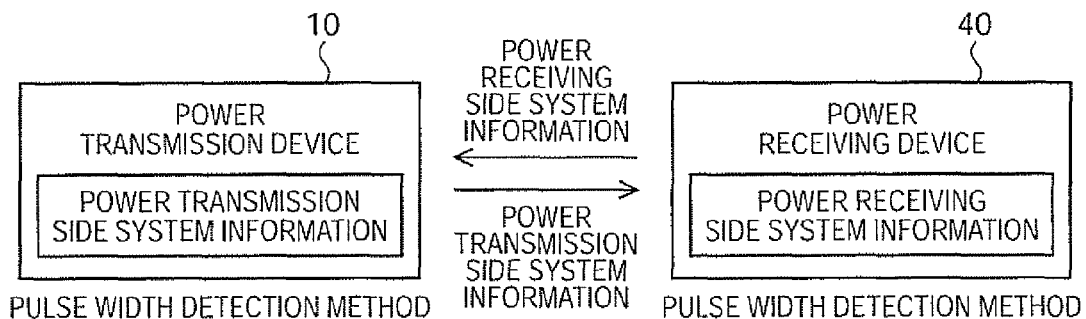

The embodiment employs a method in which the power transmission device 10 stores the power transmission side system information while the power receiving device 40 stores the power receiving side system information and both the system information are transmitted and received, as shown in FIG. 3C. For example, as for the load condition detection method, the power transmission device 10 employs a pulse width detection method as a first load condition detection method while the power receiving device 40 also employs the pulse width detection method as the first load condition detection method, as shown in FIG. 3C. That is, the power transmission device 10 stores first system information showing the first load condition detection method as power transmission side system information while the power receiving device 40 stores the first system information showing the first load condition detection method as power receiving side system information. Both the system information are transmitted and received between the power transmission device 10 and the power receiving device 40 to confirm that both the system information are compatible (matched), enabling contactless power transmission to be achieved more properly and safe. Consequently, various types of secondary coils can be managed without complicated management.

Figure 3D:
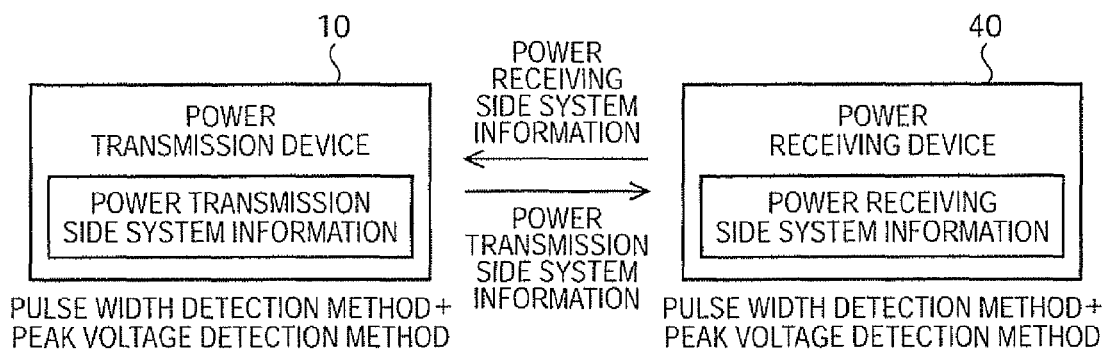

The power transmission side may store a plurality of pieces of power transmission side system information. As shown in FIGS. 3C and 3D, the power transmission device 10 can cope with both the first load condition detection method and the second load condition detection method. For example, the first load detection method is the pulse width detection method while the second load condition detection method is a method using both the pulse width detection method and a peak voltage detection method. As an example, foreign object detection and data detection are performed by the pulse width detection method while removal detection is performed by the peak voltage detection. In this example, the power transmission device 10 stores the first system information showing the first load condition detection method as well as a second system information showing a second load condition detection method.

As shown in FIG. 3C, for example, the power receiving device 40, which employs the first load condition detection method (pulse width detection method), sends the first system information showing the first load condition detection method to the power transmission device 10. In this case, the power transmission device 10 transmits the first system information matching the system information on the power receiving side to the power receiving device 40 out of a plurality of pieces of system information on the power receiving side.

As shown in FIG. 3D, for another example, the power receiving device 40, which employs the second load condition detection method (using the pulse width detection method and the peak voltage detection method together), sends the second system information showing the second load condition detection method to the power transmission device 10. In this case, the power transmission device 10 transmits the second system information matching the system information on the power receiving side to the power receiving device 40 out of a plurality of pieces of system information on the power receiving side. That is, the power transmission device 10 transmits system information matching the power receiving side system information out of the plurality of pieces of power transmission side system information, to the power receiving device 40. Accordingly, variations in matching the system information on the primary side and that of the secondary side can be increased, whereby a more flexible system can be provided. In addition to the power transmission side, the storing section 53, on the power receiving side, may store a plurality of pieces of power receiving side system information.

Next, an operation of the embodiment will be described in detail with reference to FIGS. 4A to 5C.

Figure 4A:
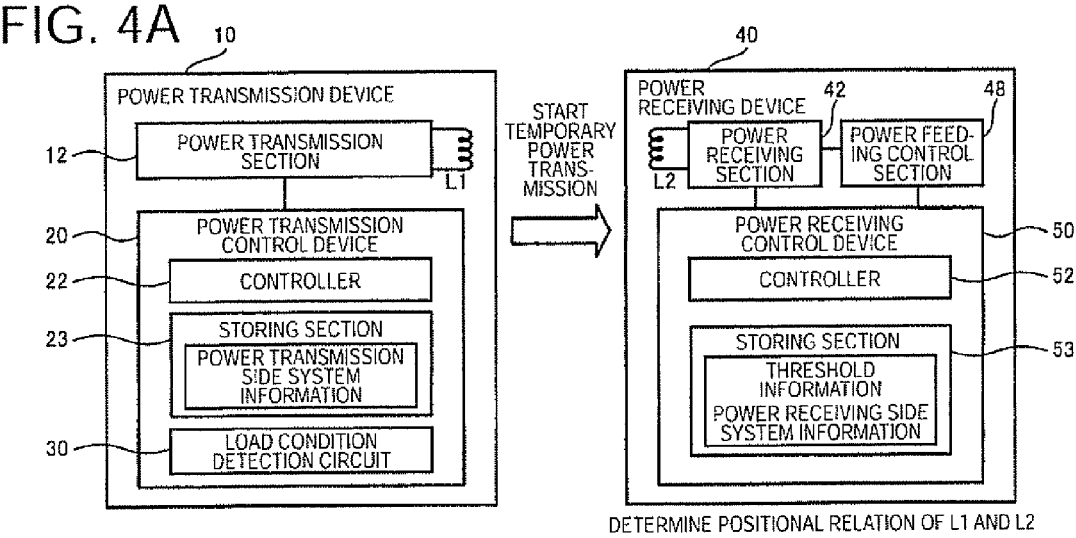
FIGS. 4A, 4B, and 4C are schematic views explaining an operation according to the embodiment.

As shown in FIG. 4A, first, the power transmission device 10 starts temporary power transmission (power transmission for detecting a position) before starting the normal power transmission. With this temporary power transmission, a power supply voltage is supplied to the power receiving device 40, so that the power receiving device 40 is turned on. The power receiving device 40, for example, determines whether or not a positional relation between the primary coil L1 and the secondary coil L2 is appropriate. Specifically, the power receiving device 40 determines whether or not the positional relation between the primary coil L1 and the secondary coil L2 is that is shown in FIG. 1B, for example.

Figure 4B:
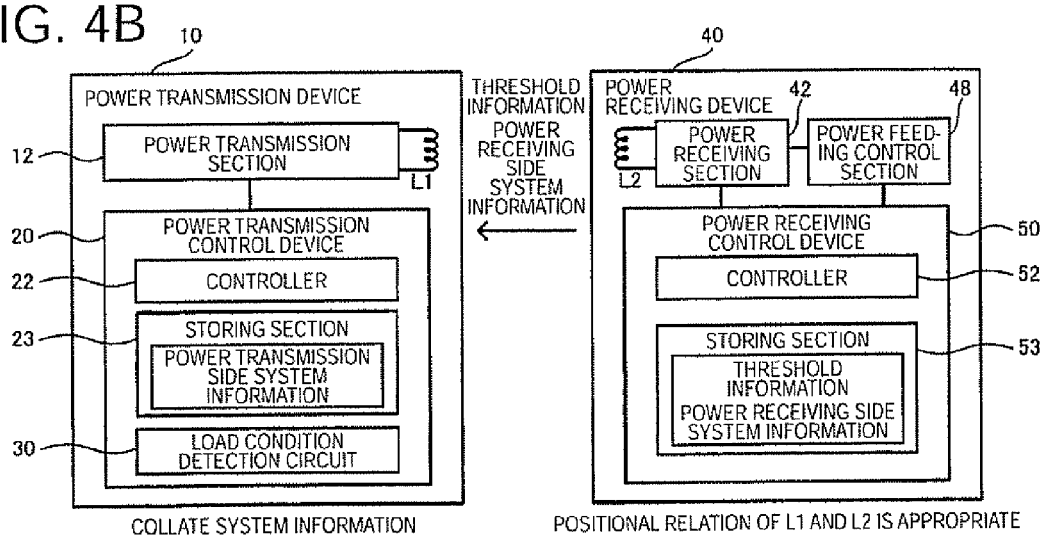

As shown in FIG. 4B, if the positional relation between the L1 and the L2 is determined to be appropriate, the power receiving device 40 reads out threshold information and power receiving side system information from the storing section 53 to transmit them to the power transmission device 10. The power transmission device 10 sets the received threshold information as threshold information for detecting the load condition of the power receiving side. The power transmission device 10 also collates power transmission side system information stored in the storing section 23 and the received power receiving side system information.

Figure 4C:
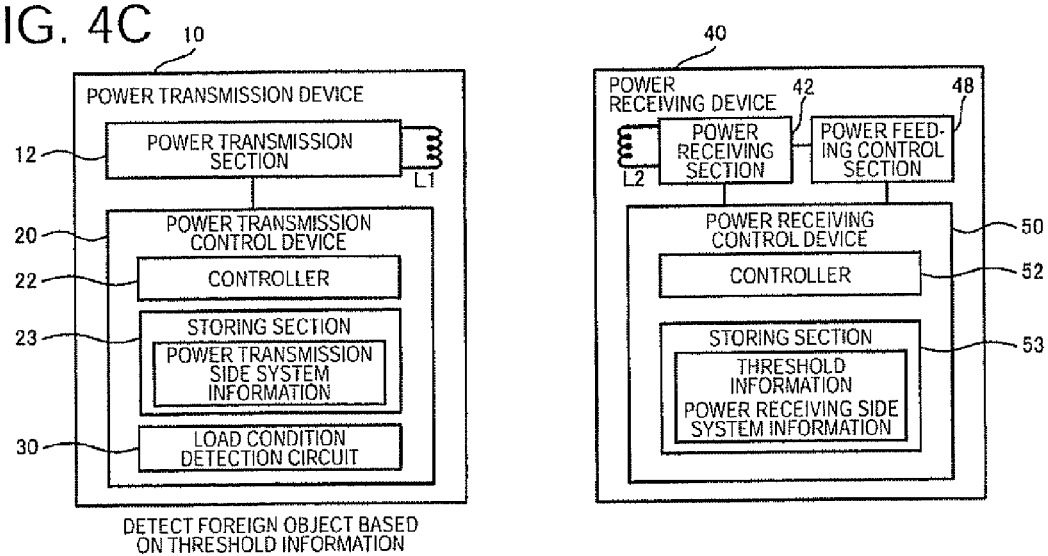
Figure 5A:
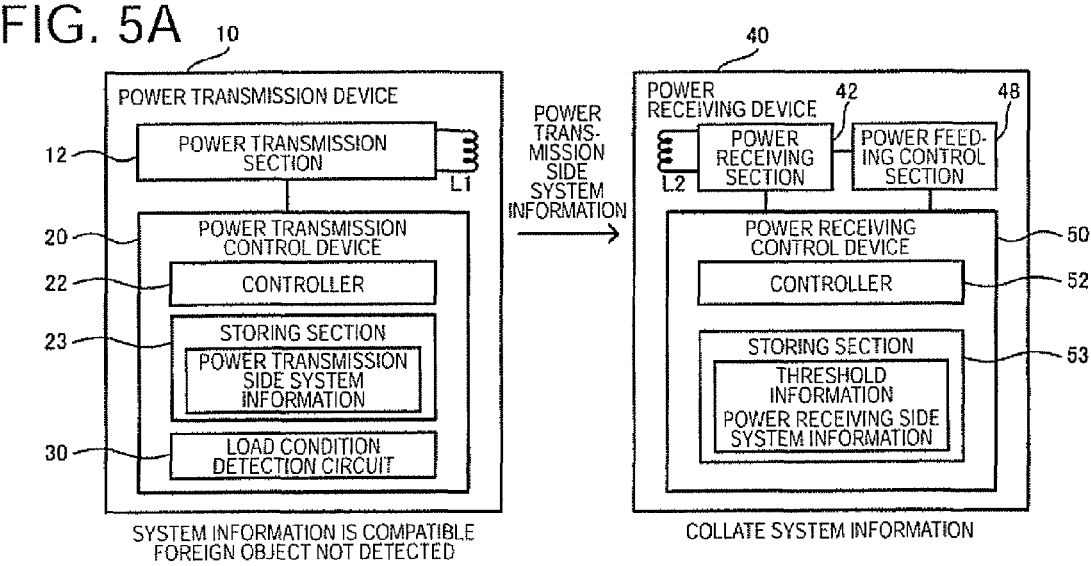
FIGS. 5A, 5B, and 5C are schematic views explaining the operation according to the embodiment.

Next, as shown in FIG. 4C, the power transmission device 10, based on the threshold information received from the power receiving device 40, detects whether or not a foreign object is inserted between the primary coil L1 and the secondary coil L2. If it is determined that the power transmission side system information and the power receiving side information are compatible (matched) and no foreign objects are detected, the power transmission device 10 transmits the power transmission side system information to the power receiving device 40, as shown in FIG. 5A.

Figure 5B:
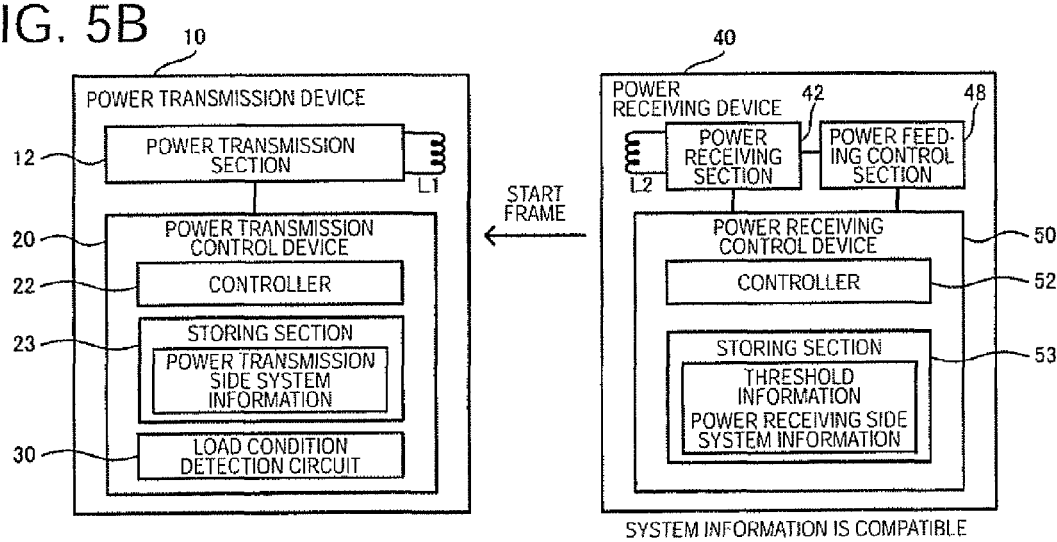
Figure 5C:
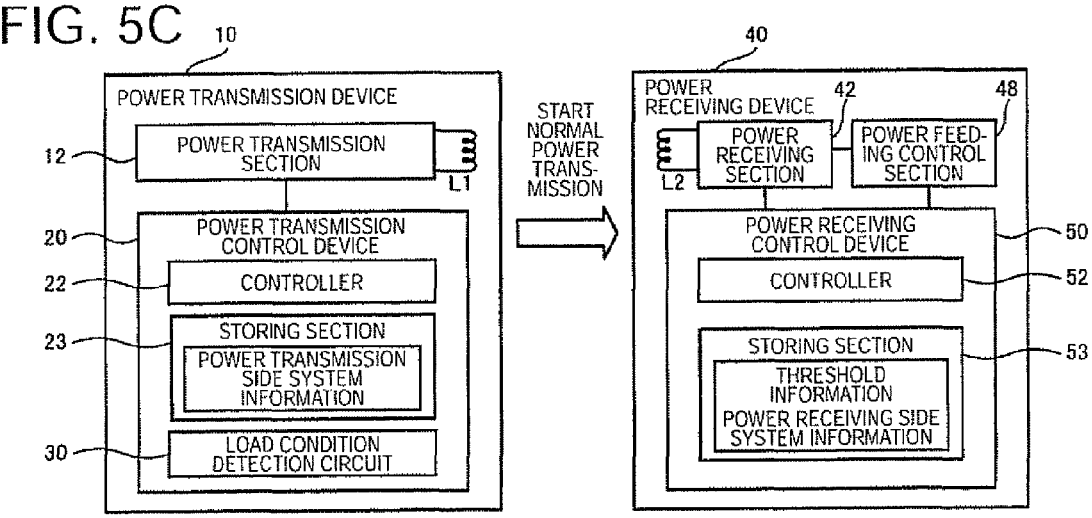

The power receiving device 40, then, collates power receiving side system information and the received power transmission side system information. If it is determined that both the system information are matched, the power receiving device 40 transmits, for example, a start frame to the power transmission device 10, as shown in FIG. 5B. As a result, the power transmission device 10 starts the normal power transmission to the power receiving device 40 to start charging the battery 94 in the load 90, as shown in FIG. 5C.

In the embodiment, as shown in FIGS. 4A to 5C, proper contactless power transmission can be realized by performing foreign object detection based on the threshold information received from the power receiving side, and exchanging and commonly having the system information on both the power transmission side and the power receiving side. In addition, various combinations of the primary side and the secondary side can be managed. Further, a more proper contactless power transmission can be achieved since foreign object detection is performed in transmitting and receiving system information and the like as shown in FIG. 4C.

4. Process Sequence of Contactless Power Transmission

Figure 6:
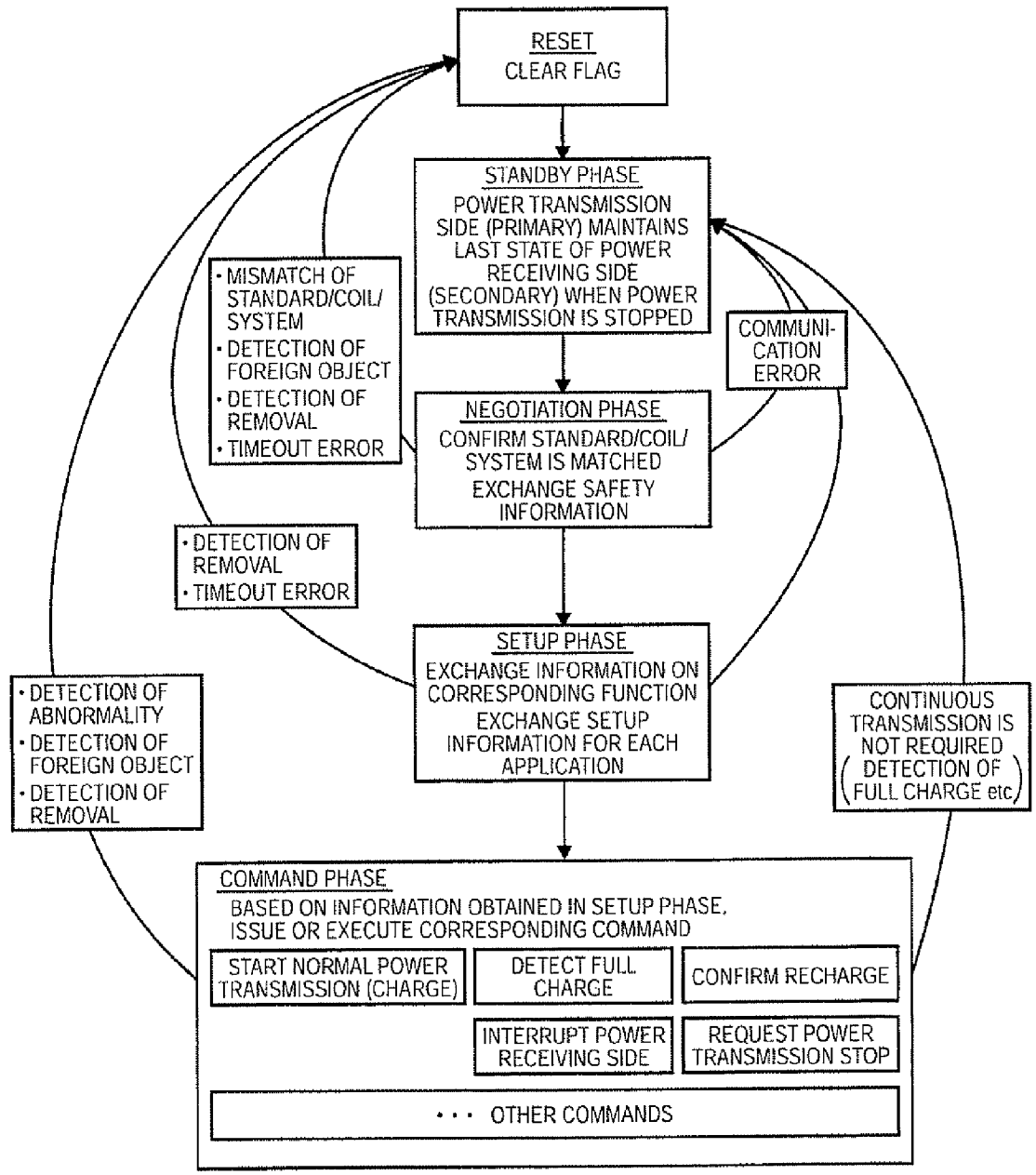
FIG. 6 is a schematic view explaining a process sequence of the contactless power transmission of the embodiment.

FIG. 6 schematically shows a process sequence of contactless power transmission realized by the embodiment.

In the process sequence, the power transmission device and the power receiving device move into a standby phase after a reset state. In the reset state, various flags maintained on the power transmission side (the primary side) and the power receiving side (the secondary side) are cleared. Here, the flags represent conditions of the power transmission device and the power receiving device (a power transmission state, a full charge state, a recharge confirmation state, and the like), and kept in the storing sections (registers) of the devices.

In the standby phase, the power transmission side (the primary side) maintains the last state of the power receiving side (the secondary side) at the time of stoppage (at the time at which power transmission is stopped). For example, if a full charge of the battery is detected, the power transmission side and the power receiving side move into the standby phase after detecting the full charge. In this case, since the battery needs to be recharged after detecting a battery voltage drop, the power transmission side stores that a factor of the power transmission stop is full charge detection. Specifically, the recharge confirmation flag is maintained in the set state without clearing it so as to periodically confirm whether or not a recharge is required.

In the standby phase, power transmission from the power transmission side to the power receiving side is stopped. As a result, a power supply voltage is not supplied to the power receiving side, so that the power receiving side is in a stop state. On the other hand, a power supply voltage is supplied to the power transmission side, so that the power transmission side is in an operating state. As described above, the power receiving side stops the operation in the standby phase, whereby achieving low power consumption. At this time, the power transmission side maintains flags for various states without clearing them, so that the power transmission side can perform various processes by using the flags after the standby phase.

The power transmission side and the power receiving side move into a negotiation phase after the standby phase. In the negotiation phase, a negotiation process is performed. In the negotiation process, a match of standard/coil/system is confirmed and safety information is exchanged. Specifically, the power transmission side and the power receiving side exchange standard/coil/system information so as to confirm whether or not both the information are matched. In addition, for example, safety threshold information for detecting foreign objects and the like is transmitted from the power receiving side to the power transmission side so as to exchange safety information. In the negotiation process, the following are confirmed: whether or not information can be communicated between the power transmission side and the power receiving side; whether or not the communicated information is adequate; whether or not a load condition on the power receiving side is appropriate (undetection of foreign objects); and the like.

In the negotiation process, the power transmission side and the power receiving side move into the reset state, and the various flags are cleared, if any of the following cases occur: a mismatch of standard/coil/system is determined; a foreign object is detected; a removal of the apparatus is detected; and a timeout error occurs. On the other hand, if a communication error occurs, the power transmission side and the power receiving side move into the standby phase, for example, and the flags are not cleared.

The power transmission side and the power receiving side move into a setup phase after the negotiation phase. In the setup phase, a setup process is performed in which setup information such as corresponding function information and setup information for each application is transferred. For example, based on a result of the negotiation process, a transmission condition of contactless power transmission is set up. Specifically, if the power receiving side transmits transmission condition information such as a driving voltage as well as a driving frequency of a coil to the power transmission side, the power transmission side sets a transmission condition such as the driving voltage and the driving frequency of the coil for normal power transmission based on the received transmission condition information. In addition, information on corresponding functions and setup information different from upper applications are also exchanged in the setup process. Specifically, in the setup process, information on additional corresponding functions are exchanged, such as kinds of commands that can be issued and executed by the power transmission side and the power receiving side in a command phase, and a periodic authentication function. Accordingly, setup information can be exchanged that is different from application to application such as kinds (a cell phone, audio equipment, and the like) and models of electric apparatuses.

In the setup process, the power transmission side and the power receiving side move into the reset state if a removal of the apparatus is detected or a timeout error occurs. On the other hand, if a communication error and the like occur, the power transmission side and the power receiving side move into the standby phase.

The power transmission side and the power receiving side move into the command phase after the setup phase. In the command phase, a command process is performed based on the information obtained in the setup process. That is, a corresponding command (a command that is confirmed to be available in the setup process) is issued or executed. The command executed in the command process includes, for example, a normal power transmission (a charge) start command, a full charge detection (notifying) command, a recharge conformation command, a power receiving side interrupt command, a power transmission stop request command.

For example, when the normal power transmission is ready by the negotiation process and the setup process, the power transmission side transmits (issues) the normal power transmission (a charge) start command to the power receiving side. Then, the power receiving side receives the command and transmits a response command to the power transmission side so as to start the normal power transmission. If a full charge is detected on the power receiving side after the normal power transmission is started, the power receiving side transmits the full charge detection command to the power transmission side.

If continuous power transmission is not required as the full charge is detected, the power transmission side and the power receiving side move into the standby phase after detecting the full charge. After going through the negotiation process and the setup process again, the power transmission side transmits the recharge confirmation command to the power receiving side. Receiving the command, the power receiving side checks a battery voltage so as to determine whether or not a recharge is required. If a recharge is required, the flag recharge confirmation flag is reset. The power transmission side issues the normal power transmission start command so as to restart the normal power transmission. On the other hand, if a recharge is not required, the recharge confirmation flag is maintained in the set state. Then, the power transmission side and the power receiving side return to the standby phase after detecting the full charge.

If any abnormality, foreign objects, or a removal is detected in the command process, the power transmission side and the power receiving side move into the reset state.

Figure 7:
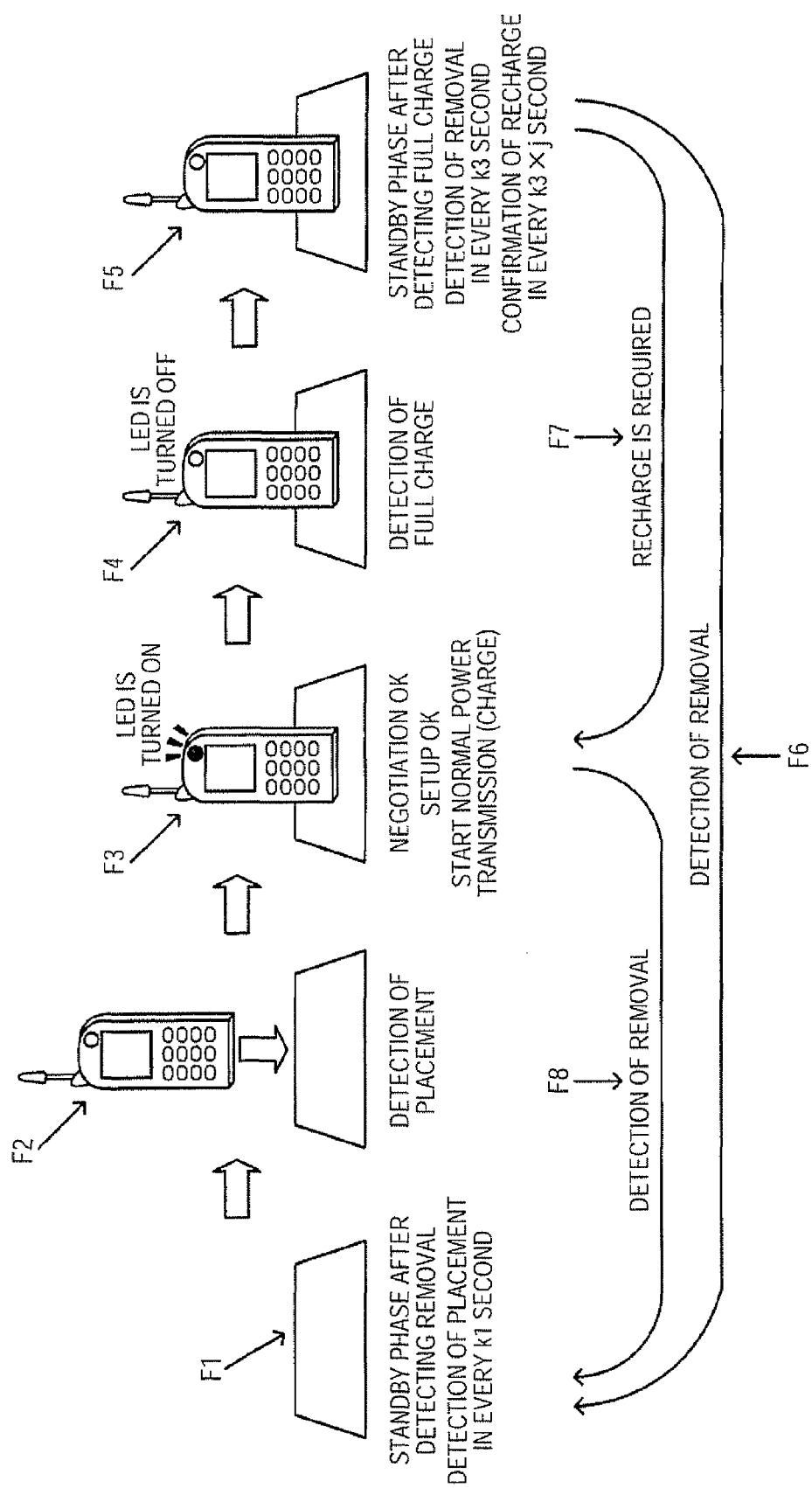
FIG. 7 is a schematic view explaining a process sequence of the contactless power transmission of the embodiment.

The process sequence according to the embodiment is more specifically described with reference to FIG. 7. In the standby phase after detecting the removal shown in F1, a placement is detected every k1 second, for example. As shown in F2, if a placement (an installation) of the electronic apparatus is detected, the negotiation process and the setup process are performed. As shown in F3, if the negotiation process and the setup process are normally ended, and the normal power transmission start command is issued in the command process, the normal power transmission starts so as to start charging the electronic apparatus. As shown in F4, if a full charge is detected, an LED of the electronic apparatus is turned off. Then, the process sequence moves into the standby phase of after detecting the full charge as shown in F5.

In the standby phase after detecting the full charge, a removal is detected every k3 seconds and a recharge is confirmed every k3×j seconds. Then, in the standby phase after detecting the full charge, if a removal of the electronic apparatus is detected as shown in F6, the process sequence moves into the standby phase after detecting the removal. On the other hand, in the standby phase after detecting the full charge, if it is determined that a recharge is required by the recharge confirmation as shown in F7, the negotiation process and the setup process are performed. Then, the normal power transmission is restarted so as to start recharging the battery. If a removal of the electric apparatus is detected during the normal power transmission as shown in F8, the process sequence moves into the standby phase after detecting the removal.

FIG. 8A shows a format example of a negotiation frame transferred in the negotiation process. The negotiation frame includes a start field, an information field, and an end field. The information field includes a matching code and a hardware information code.

FIG. 8B shows a format example of the matching code. The matching code includes a command ID, a standard code, an extension code, and a coil code.

The command ID is an ID indicating the matching code. The standard code indicates a version of the standard. The extension code indicates an ID code system. For example, a code length is controlled by an extension code management ledger and the like.

The coil code indicates coil information, and for example, includes a classification code and a coil ID (coil identification information). The classification code is used for designating an administrator of the coil ID. The coil ID is given to the primary coil (a primary coil unit) by the administrator. That is, an ID of the primary coil on the power transmission side is not only given to the power transmission side but also to the power receiving side as a coil ID. The definition of the coil ID changes depending on the extension code. For example, if the extension code is a first setting, the coil code is set so as to be divided into the classification code and the coil ID. On the other hand, if the extension code is a second setting, the coil code is set without being divided into the classification code and the coil ID.

FIG. 8C shows a format example of the hardware information code. The hardware information code includes a system code and a foreign object threshold. The system code indicates system information, and specifically is information indicating a method for detecting load conditions on the power transmission side and the power receiving side. Examples of the method for detecting a load condition include a pulse width detection method (a phase detection method), a current detection method, a peak voltage detection method, and a combination thereof. The system code indicates either one method employed out of the methods by the power transmission side and the power receiving side.

The foreign object threshold is safety threshold information. The foreign object threshold is, for example, stored in the power receiving side, and is transmitted from the power receiving side to the power transmission side before the normal power transmission is started. The power transmission side, based on the foreign object threshold, performs first foreign object detection that is foreign object detection before the normal power transmission is started. For example, if a load condition on the power receiving side is detected by the pulse width detection method, a threshold of a pulse width count value is transmitted from the power receiving side to the power transmission side as a foreign object threshold. Based on the threshold of the pulse width count value, the power transmission side performs the first foreign object detection by the pulse width detection method.

According to the process sequence of the embodiment, the compatibility of standard/coil/system is determined and the minimum safety information is exchanged in the negotiation process. Further, in the negotiation process, the possibility of communication and the adequacy of the communication information are determined as well as the propriety of a load condition of the power receiving device is determined.

In the setup process, a transmission condition required for the normal power transmission is set up. For example, the driving voltage and the driving frequency of the coil are set. In addition, information on additional corresponding function and setup information required for each upper application are exchanged in the setup process.

After going through the setup process and the negotiation process, the process sequence moves into the command phase so as to perform the command process. That is, a command confirmed that it is available in the negotiation process is issued or executed in the command process.

Accordingly, the minimum information required for securing the compatibility and the safety of the system is exchanged in the negotiation process, and setup information different from each application is exchanged in the setup process. As a result, if the information on the power transmission side is not compatible with that of the power receiving side, it is excluded in the negotiation process, whereby the setup information having a large volume of information is not transferred. In the negotiation process, only the minimum information is transferred, thereby an amount of transferred information can be reduced. Thus, the negotiation phase is ended in a short time, allowing achieving an efficient process.

Each apparatus on the power transmission side and the power receiving side can perform a minimum contactless power transmission by the negotiation process, and each apparatus can expand the functions by exchanging the setup information. Each apparatus makes the minimum setting required for a contactless power transmission system in the negotiation process, and the system can be optimized in the setup process. As a result, a flexible system can be realized.

The power transmission side receives threshold information and system information from the power receiving side, and can realize contactless power transmission and foreign object detection by only setting the received threshold information and the system information. Therefore, the processes on the power transmission side can be simplified. In this case, the power receiving side transmits coil information of an appropriate combination and threshold information to the power transmission side, so that appropriate and safe contactless power transmission can be realized.

5. Specific Structural Example

Figure 9:
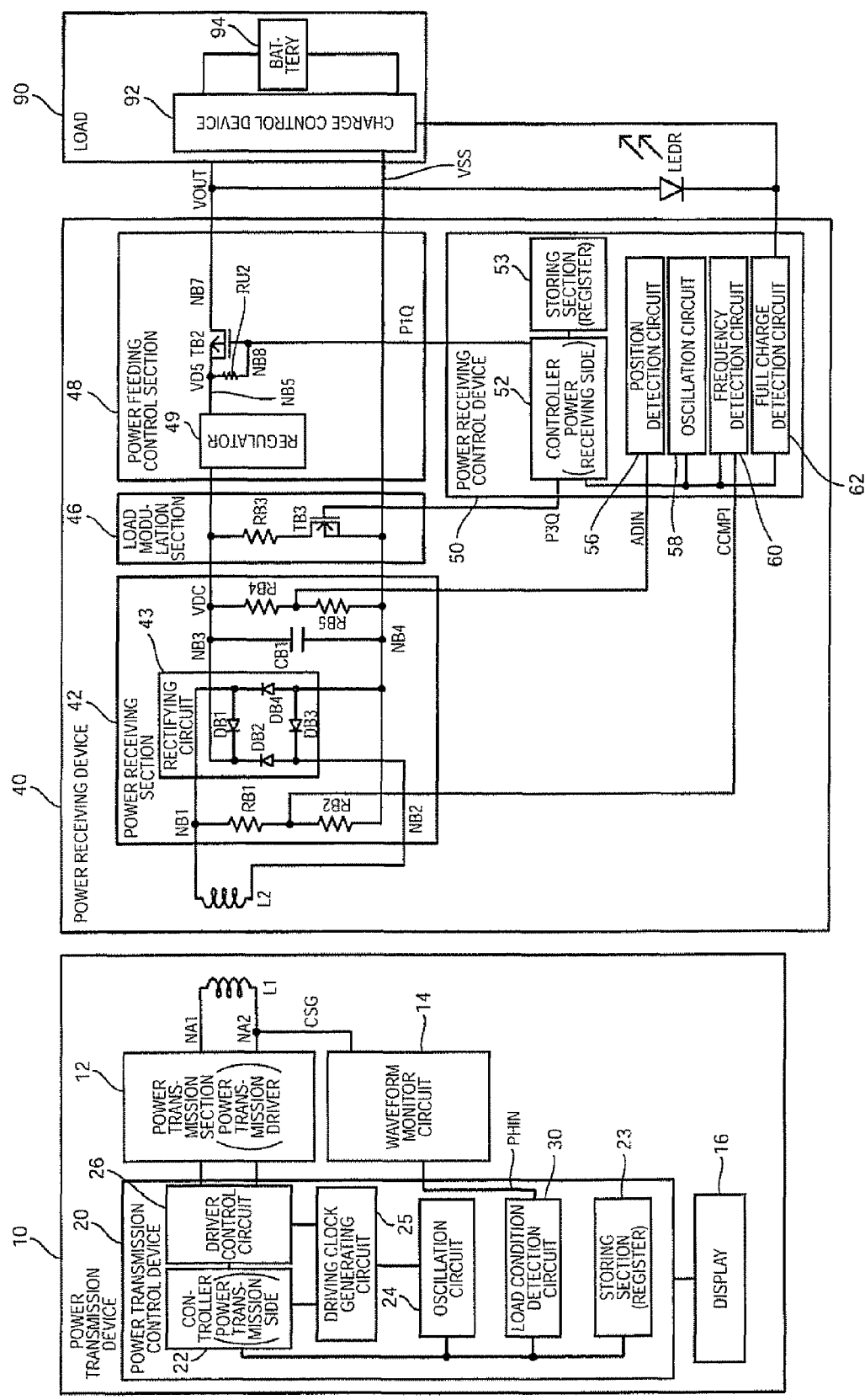
FIG. 9 is a specific structural example of the power transmission device, the power transmission control device, the power receiving device, and the power receiving control device according to the embodiment.

A detailed structural example of the embodiment is shown in FIG. 9. Hereinafter, the elements described in FIG. 2 are indicated by the same numerals and the description thereof is omitted.

A waveform monitor circuit 14 (a rectifying circuit), based on a coil terminal signal CGS, generates an induced voltage signal PHIN for a waveform monitor. For example, the coil terminal signal CGS that is an induced voltage signal of the primary coil L1 may exceed a maximum rating voltage of an IC of the power transmission control device 20 or have a negative voltage. The waveform monitor circuit 14 receives the coil terminal signal CGS so as to generate the induced voltage signal PHIN for a waveform monitor and outputs it to, for example, a terminal for a waveform monitor of the power transmission control device 20. The induced voltage signal PHIN is capable of being detected as a waveform by the load condition detection circuit 30 of the power transmission control device 20. A display 16 displays various conditions of the contactless power transmission system (in power transmitting, ID authenticating, and the like) with colors, images, and the like.

An oscillation circuit 24 generates a clock for the primary side. A driving clock generation circuit 25 generates a driving clock defining a driving frequency. A driver control circuit 26, based on the driving clock from the driving clock generation circuit 25 and a frequency set signal from the controller 22, generates a control signal having a desired frequency. Then, the control signal is outputted to first and second power transmission drivers of the power transmission section 12 so as to control the first and the second power transmission drivers.

The load condition detection circuit 30 shapes a waveform of the induced voltage signal PHIN so as to generate a waveform shaping signal. For example, the load condition detection circuit 30 generates a waveform shaping signal (a pulse signal) of a square wave (a rectangular wave). The square waveform becomes active (e.g., an H level) if the signal PHIN is beyond a predetermined threshold voltage. The load condition detection circuit 30, based on the waveform shaping signal and the driving clock, detects pulse width information (a pulse width period) of the waveform shaping signal. Specifically, the load condition detection circuit 30 receives the waveform shaping signal and the driving clock from the driving clock generation circuit 25 so as to detect pulse width information of the waveform shaping signal. Accordingly, the pulse width information of the induced voltage signal PHIN is detected.

As for the load condition detection circuit 30, the detection method is not limited to the pulse width detection method (phase detection method). Various methods such as the current detection method and the peak voltage detection method can be employed.

The controller 22 (the power transmission control device), based on a detection result in the load condition detection circuit 30, determines a load condition (load fluctuation, a degree of the load) of the power receiving side (the secondary side). For example, the controller 22, based on the pulse width information detected in the load condition detection circuit 30 (a pulse width detection circuit), determines a load condition of the power receiving side so as to detect, for example, data (a load), a foreign object (metal), a removal (placement and removal), and the like. That is, a pulse width period that is pulse width information of the induced voltage signal varies in accordance with a load condition on the power receiving side. The controller 22 can detect load fluctuation on the power receiving side based on the pulse width period (a count value obtained by measuring the pulse width period).

The power receiving section 42 converts an alternating induced voltage of the secondary coil L2 into a direct-current voltage. The conversion is performed by a rectifying circuit 43 included in the power receiving section 42.

A load modulation section 46 performs a load modulation process. Specifically, when desired data is transmitted from the power receiving device 40 to the power transmission device 10, a load on the load modulation section 46 (the secondary side) is variably changed so as to change a signal waveform of the induced voltage of the primary coil L1. Accordingly, the load modulation section 46 includes a resistor RB3 provided in series between nodes NB3 and NB4, and a transistor TB3 (an N-type CMOS transistor). The transistor TB3 is on/off-controlled by a signal P3Q from the controller 52 of the power receiving control device 50. When the transistor TB3 is on/off-controlled so as to perform a load modulation, a transistor TB2 of the power feeding control section 48 is turned off. As a result, the load 90 is in a state of not being electrically coupled to the power receiving device 40.

The power feeding control section 48 controls power feeding to the load 90. A regulator 49 regulates a voltage level of a direct-current voltage VDC obtained by the conversion in the rectifying circuit 43 so as to generate a power supply voltage VD5 (e.g., 5V). The power receiving control device 50 operates with a supply of the power supply voltage VD5, for example.

The transistor TB2 (a P-type CMOS transistor, a power feeding transistor) is controlled by a signal P1Q from the controller 52 of the power receiving control device 50. Specifically, the transistor TB2 is turned off during the negotiation process and the setup process while turned on after normal power transmission is started.

A position detection circuit 56 determines whether or not a positional relation between the primary coil L1 and the secondary coil L2 is appropriate. An oscillation circuit 58 generates a clock for the secondary side. A frequency detection circuit 60 detects frequency (f1 and f2) of a signal CCMPI. A full charge detection circuit 62 detects whether or not the battery 94 (a secondary battery) of the load 90 is in a full charge state (a charged state).

The load 90 may include a charge control device 92 controlling a charge and the like of the battery 94. The charge control device 92 (a charge control IC) can be realized by an integrated circuit device and the like. Further, as a smart battery, the battery 94 itself may have a function of the charge control device 92.

In FIG. 9, data communication from the power transmission side to the power receiving side is realized by a frequency modulation while data communication from the power receiving side to the power transmission side is realized by a load modulation.

Figure 10A:
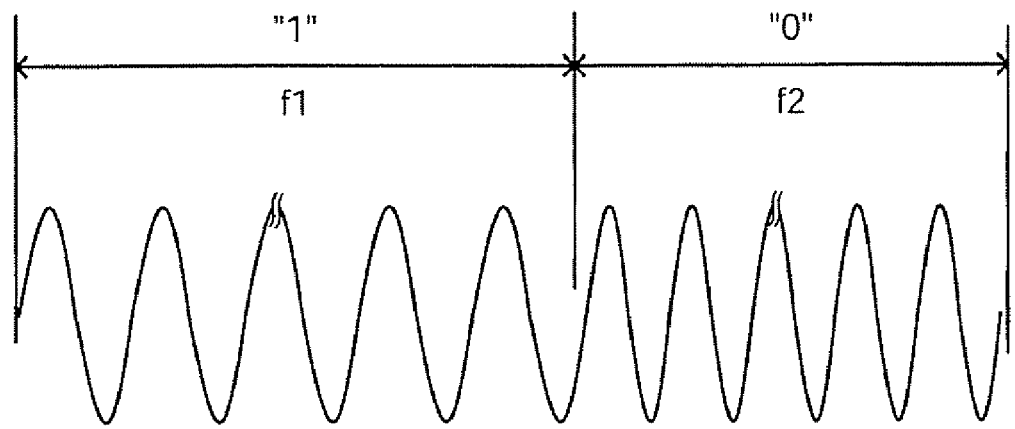
FIGS. 10A and 10B are explanatory views of data transmission by a frequency modulation and a load modulation.

Specifically, as shown in FIG. 10A, for example, when data "1" is transmitted to the power receiving side, the power transmission section 12 generates an alternating-current voltage of a frequency f1. On the other hand, when data "0" is transmitted, the power transmission section 12 generates an alternating-current voltage of a frequency f2. Then, the frequency detection circuit 60, on the power receiving side, detects the frequency change so as to determine data "1" or "0." As a result, data communication by the frequency modulation from the power transmission side to the power receiving side can be realized.

Figure 10B:
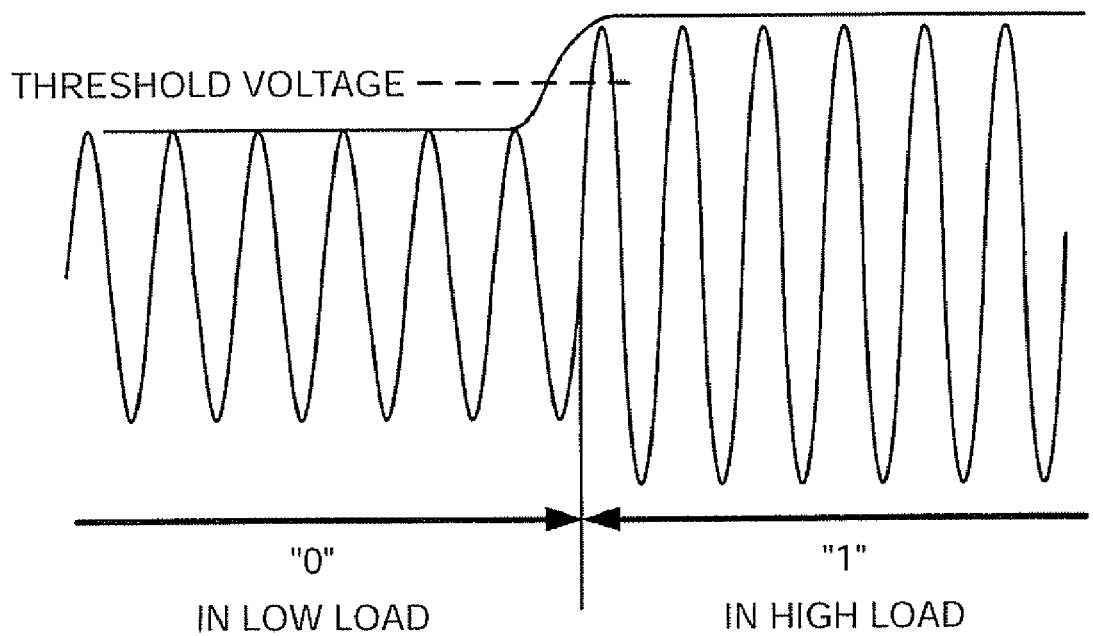

On the other hand, in the load modulation section 46, on the power receiving side, a load of the power receiving side is variably changed in accordance with data to be transmitted. That is, as shown in FIG. 10B, a signal waveform of the induced voltage of the primary coil L1 is changed. For example, when data "1" is transmitted to the power transmission side, the power receiving side is in a high load condition. On the other hand, when data "0" is transmitted, the power receiving side is in a low load condition. Then, the load condition detection circuit 30, on the power transmission side, detects the load condition change on the power receiving side so as to determine data "1" or "0." As a result, data communication by the load modulation from the power receiving side to the power transmission side can be realized.

In FIGS. 10A and 10B, data communication from the power transmission side to the power receiving side is realized by the frequency modulation while data communication from the power receiving side to the power transmission side is realized by the load modulation. However, another modulation method or other methods may be employed.

6. Operation

Figure 11:
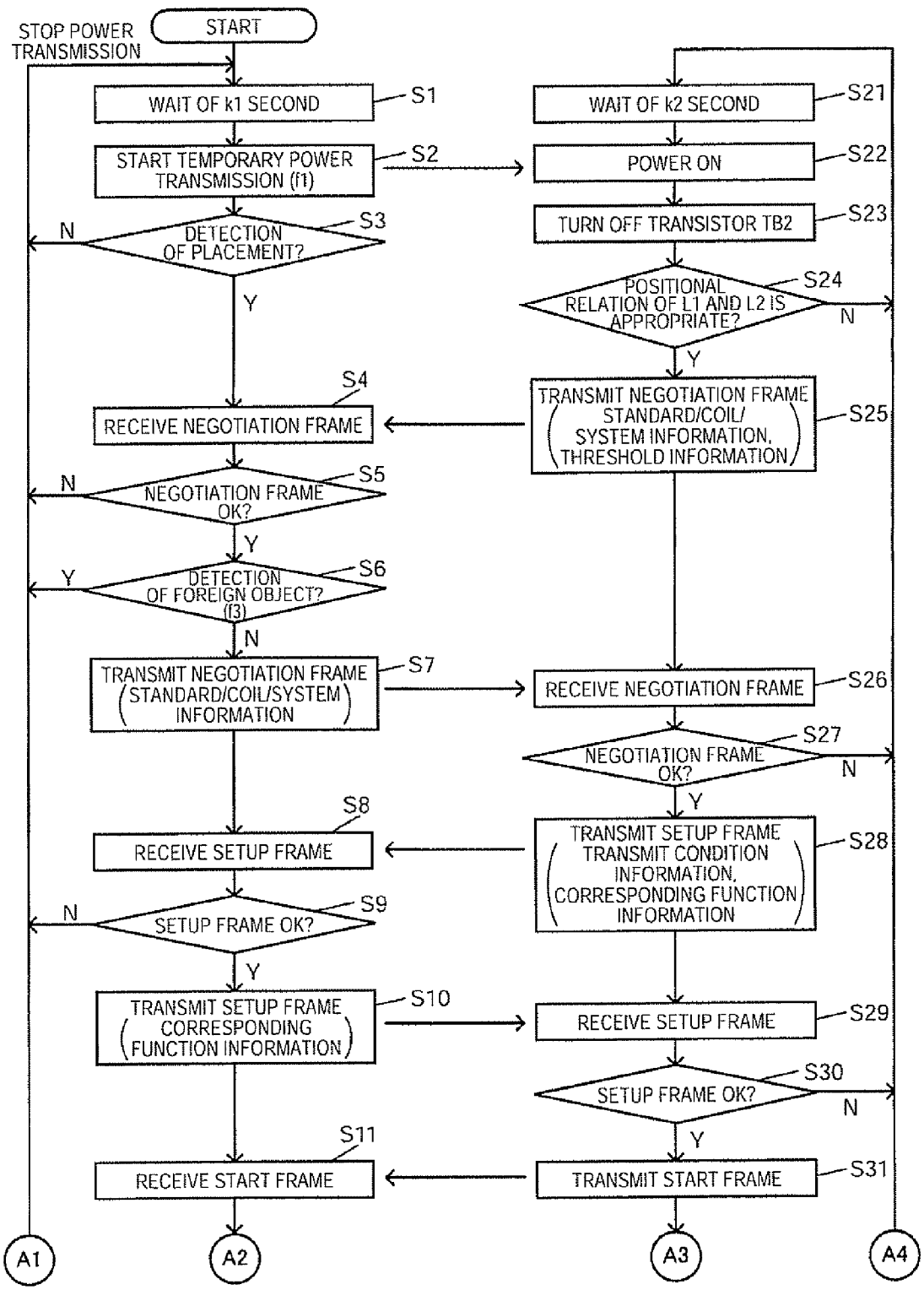
FIG. 11 is a flowchart explaining the operation according to the embodiment.
Figure 12:
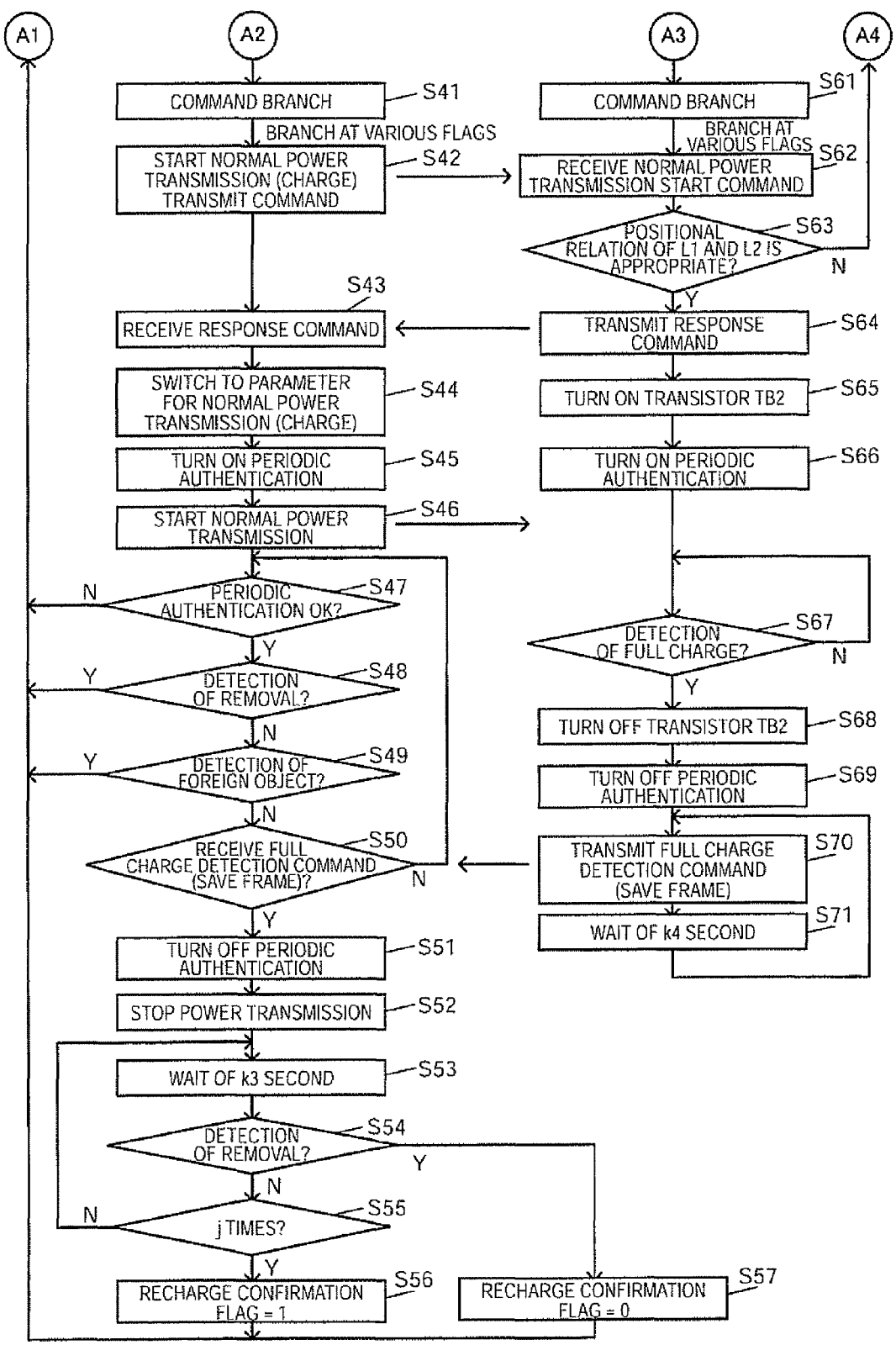
FIG. 12 is a flowchart explaining the operation according to the embodiment.

Next, operations on the power transmission side and the power receiving side will be described in detail with reference to flowcharts shown in FIGS. 11 and 12.

Upon turning on a power, the power transmission side, for example, after a wait of a k1 second (step S1), temporary power transmission before starting normal power transmission is performed (step S2). The temporary power transmission is temporary electric power transmission for placement detection, position detection, and the like. That is, the power is transmitted for detecting whether or not the electric apparatus is placed on the charger as shown in F2 of FIG. 7, and, if the electric apparatus is placed, whether or not the electric apparatus is placed on an appropriate position. A driving frequency (a frequency of a driving clock from the driving clock generation circuit) in the temporary power transmission is set to the f1, for example.

The temporary power transmission from the power transmission side allows the power receiving side to be turned on (step S22), thereby releasing a reset of the power receiving control device 50. Then, the power receiving control device 50 sets the signal P1Q shown in FIG. 9 to H level. As a result, the transistor TB2 of the power feeding control section 48 is turned off (step S23), so that the electrical connection between the power receiving side and the load 90 is interrupted.

Next, the power receiving side determines by using the position detection circuit 56 whether or not a positional relation (a position level) between the primary coil L1 and the secondary coil L2 is appropriate (step S24). If the positional relation is not appropriate, the power receiving side waits, for example, for a period of k2 seconds (step S21).

On the other hand, if the positional relation is appropriate, the power receiving side makes a negotiation frame so as to transmit it to the power transmission side (step S25). Specifically, by the load modulation described in FIG. 10, the negotiation frame is transmitted. The negotiation frame includes, for example, a matching code such as standard information and coil information, system information (load condition detection method), and hardware information such as threshold information (threshold for detecting a load condition) stored in the storing section 53 on the power receiving side.

Receiving the negotiation frame (step S4), the power transmission side verifies the negotiation frame (step S5). Specifically, the power transmission side confirms whether or not the standard/coil/system information stored in the storing section 23 on the power transmission side and the received standard/coil/system information are matched. Then, if the negotiation frame is determined to be an appropriate one, foreign object detection is performed (step S6).

Specifically, the power transmission side sets a driving frequency to a frequency f3 for detecting a foreign object. Then, based on the threshold information (safety threshold information) received from the power receiving side, first foreign object detection before starting normal power transmission is performed so as to determine whether or not a load condition of the power receiving side is appropriate. For example, an enable signal for detecting a foreign object is activated so as to instruct the load condition detection circuit 30 to start detecting a foreign object. The foreign object detection can be realized by comparing, for example, load condition detection information (pulse width information) from the load condition detection circuit 30 with a threshold (META) for detecting a load condition received from the power receiving side. After the period of detecting a foreign object ends, the power transmission side returns the driving frequency to the frequency f1 for normal power transmission.

If the negotiation frame is determined to be inappropriate in the step S5 or a foreign object is detected in the step S6, the power transmission side stops power transmission so as to return to the step S1.

Next, the power transmission side makes a negotiation frame so as to transmit it to the power receiving side (step S7). The negotiation frame includes, for example, the standard information, the coil information, and the system information stored in the storing section 23 on the power transmission side.

Receiving the negotiation frame (step S26), the power receiving side verifies the negotiation frame (step S27). Specifically, the power receiving side confirms whether or not the standard/coil/system information stored in the storing section 53 on the power receiving side and the standard/coil/system information received from the power transmission side are matched. Then, if the negotiation frame is determined to be appropriate, the power receiving side generates a setup frame so as to transmit it to the power transmission side (step S28).

The setup frame includes parameter data such as transmission condition information and corresponding function information. Here, the transmission condition information is the driving voltage and the driving frequency of the primary coil, and the like. The corresponding function information represents an additional function for each application and the like. If the setup frame is not appropriate, the procedure returns to the step S21.

Receiving the setup frame (step S8), the power transmission side verifies the setup frame (step S9). If the setup frame from the power receiving side is appropriate, the power transmission side makes a setup frame on the power transmission side so as to transmit it to the power receiving side (step S10). On the other hand, if the setup frame is not appropriate, the power transmission side stops power transmission so as to return to the step S1.

Receiving the setup frame (step S29), the power receiving side verifies the setup frame (step S30). If the setup frame is appropriate, the power receiving side makes a start frame so as to transmit it to the power transmission side (step S31). On the other hand, if the setup frame is not appropriate, the power receiving side returns to the step S21.

If the start frame is transmitted, the power transmission side and the power receiving side move into a command branch (steps S41 and S61). That is, a command determination is performed so as to be split into one of command processes corresponding to each flag.

Specifically, if there is no command requiring a priority process (e.g., an interrupt command), the power transmission side transmits a normal power transmission (a charge) start command to the power receiving side (step S42). Receiving the normal power transmission start command (step S62), the power receiving side determines whether or not the positional relation between the primary coil L1 and the secondary coil L2 is appropriate (step S63). If it is adequate, a response command is transmitted to the power transmission side (step S64).

Receiving the response command (step S43), the power transmission side switches various parameters to a parameter for normal power transmission (step S44). Specifically, parameters such as transmission conditions are switched to parameters set in the setup process. Then, periodic authentication is turned on (step S45), and normal power transmission is started (step S46).

Transmitting the response command (step S64), the power receiving side turns on the transistor TB2 of the power feeding control section 48 (step S65) so as to start power supply to the load 90. The periodic authentication is turned on so as to perform a periodic load modulation (step S66). Specifically, the transistor TB3 of the load modulation section 46 is turned on/off in accordance with a predetermined pattern in a periodic authentication period.

After normal power transmission is started, in the periodic authentication period performed by the periodic load modulation, the power transmission side detects a takeover state caused by a metal foreign object and the like having a large area (step S47). Further, removal detection and foreign object detection are performed (steps S48 and S49). If any takeover is detected in the periodic authentication, or removal or foreign object is detected, the power transmission is stopped so as to return to the step S1.

After normal power transmission is started, the power receiving side detects whether or not the battery 94 is fully charged (step S67). If the full charge is detected, the transistor TB2 is turned off (step S68), and the power supply to the load 90 is stopped. Further, the periodic authentication is turned off (step S69). Then, a full charge detection command (a save frame) that notifies the detection of a full charge is transmitted to the power transmission side (step S70), and after a wait period of k4 seconds (step S71), the process of the step 70 is repeated.

Receiving the full charge detection command (the save frame), the power transmission side turns off the periodic authentication, and the power transmission is stopped (steps S51 and S52). Then, the power transmission side moves into the standby phase after detecting the full charge (step S53).

In the standby phase after detecting the full charge, for example, a removal is detected every k3 seconds (step S54). Then, if a removal is detected, the recharge confirmation flag is reset to 0 (step S57), and the power transmission is stopped so as to return to the step S1.

In the standby phase after detecting the full charge, for example, a recharge is confirmed every k3×j seconds, and the recharge confirmation flag is set to 1 (step S55 and S56). Then, the power transmission is stopped so as to return to the step S1. In this case, the negotiation process and the setup process are performed. Since the recharge confirmation flag is 1 in the command branch of the step S41, the power transmission side moves into the process of the recharge confirmation command.

7. Load Condition Detection Circuit

Figure 13A:
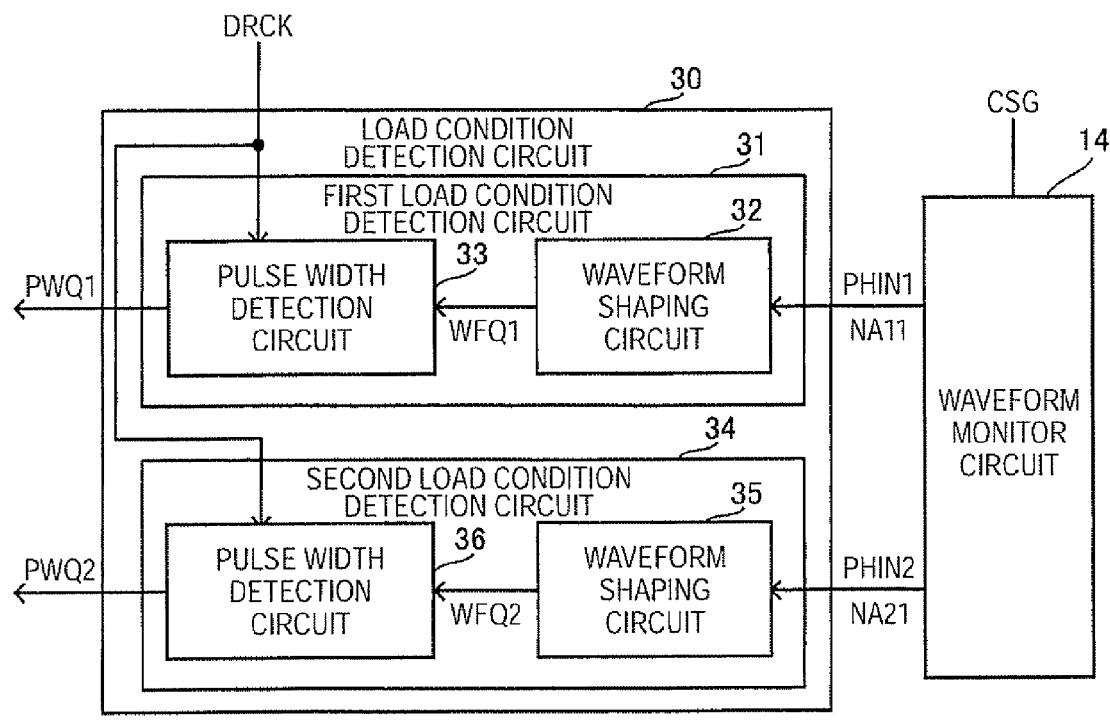
FIGS. 13A, 13B, and 13C are views explaining examples of a load condition detection circuit and a load condition detection method.

FIG. 13A shows a structural example of the load condition detection circuit 30. The load condition detection circuit 30 includes a first load condition detection circuit 31 and a second load condition detection circuit 34.

The first load condition detection circuit 31 includes a waveform shaping circuit 32 and a pulse width detection circuit 33, and detects pulse width information (PWQ1), by the pulse width detection method as a first method, to output it to the controller 22. For example, a pulse width period XTPW1 is measured. The pulse width period XTPW1 is a period between an edge timing (e.g., rising timing) of a driving clock DRCK outputted from the driving clock generation circuit 25 and a timing at which an induced voltage signal PHIN1 (coil terminal signal CSG) outputted from the waveform monitor circuit 14 rises to over a given threshold voltage VTL.

The second load condition detection circuit 34 includes a waveform shaping circuit 35 and a pulse width detection circuit 36, and detects pulse width information (PWQ2), by the pulse width detection method as a second method, to output it to the controller 22. For example, a pulse width period XTPW2 is measured. The pulse width period XTPW2 is a period between an edge timing (e.g., falling timing) of the driving clock DRCK and a timing at which an induced voltage signal PHIN2 (coil terminal signal CSG) falls to be under a given threshold voltage VTH.

The first load condition detection circuit 31, for example, performs the first foreign object detection before starting normal power transmission while the second load condition detection circuit 34, for example, performs the second foreign object detection after starting normal power transmission. The load condition detection circuit 30 may detect a load condition by any one of the first and the second methods, and another load fluctuation other than the foreign object detection.

Figures 13B, 13C:
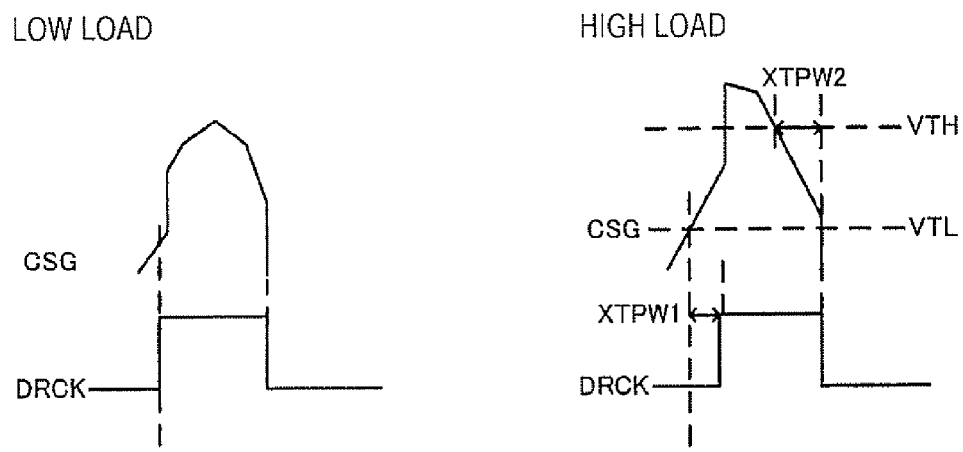

FIG. 13B shows an example of the waveform of the coil terminal signal CSG in a case in which the load of the power receiving side (the secondary side) is low (a load current is small) while FIG. 13C shows another example of the wave form of the oil terminal signal CSG in a case in which the load of the power receiving side is high (a load current is large). As shown in FIGS. 13B and 13C, as the load of the power receiving side increases the waveform of the coil terminal signal CSG is distorted.

In the pulse width detection method as the first method, the pulse width period XTPW1 at the rising timing of the coil terminal signal CGS is detected so as to detect the load fluctuation as shown in FIG. 3C. In the pulse width detection method as the second method, the pulse width period XTPW2 at the falling timing of the coil end signal CGS is detected so as to detect the load fluctuation. The first method, thus, has a problem in that it has lower variation in detecting the pulse width with respect to power supply voltage fluctuations, but lower sensitivity to the load fluctuation as compared with the second method. In this regard, the sensitivity to the load fluctuation can be enhanced by setting a foreign object detection frequency closer to the coil resonance frequency when detecting foreign object using the first method, because the distortion of the waveform to the load fluctuation becomes large by the setting. As a result, the first foreign object detection can be properly performed.

The load condition detection method is not limited to ones described in FIGS. 13A to 13C. Various methods such as the current detection method and the amplitude detection method can be employed.

Figure 14A:
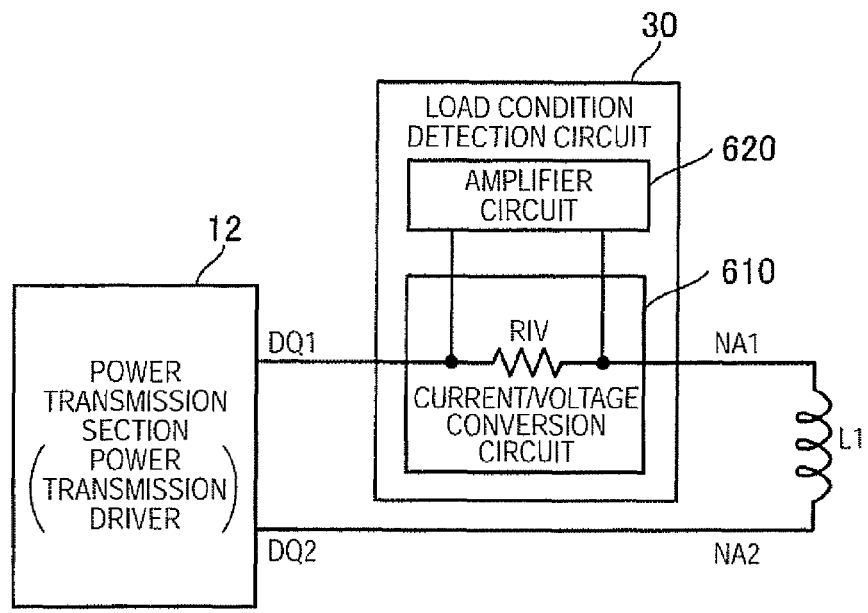
FIGS. 14A and 14B are modification examples of the load condition detection circuit.
Figure 14B:
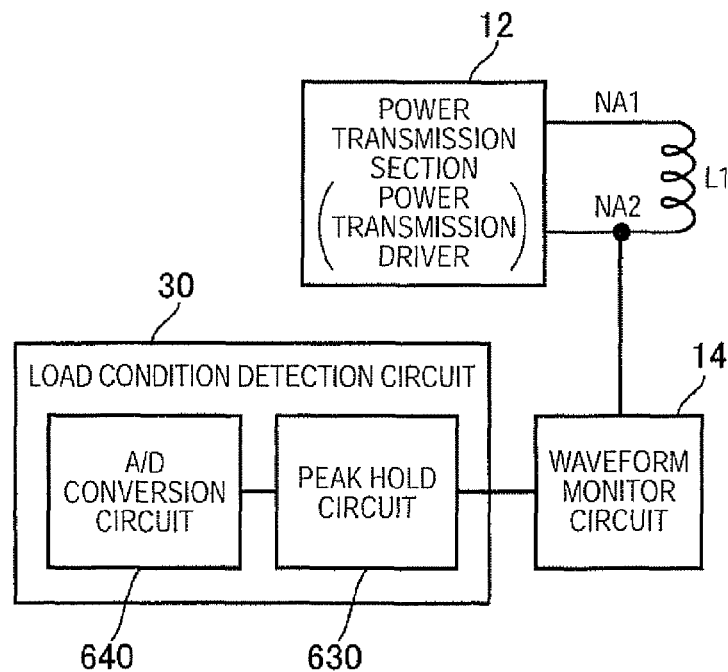

FIG. 14A shows a structural example of the load condition detection circuit 30 that detects load conditions by detecting current. In FIG. 14A, the load condition detection circuit 30 includes a current/voltage conversion circuit 610 and an amplifier circuit 620. The current/voltage conversion circuit 610 including a resistor RIV detects a current flowing at the coil terminal and converts it into a voltage. The converted voltage is amplified by the amplifier circuit 620. Based on a signal after the amplification, a load condition on the power receiving side is detected. Specifically, the load condition of the power receiving side can be detected by comparing the coil terminal current and the coil terminal voltage, In FIG. 14B, the load condition detection circuit 30 includes a peak hold circuit (amplitude detection circuit) 630 and an A/D conversion circuit 640. The peak hold circuit 630 holds a peak of the induced voltage signal PHIN from the waveform monitor circuit 14, detecting a peak voltage (amplitude information in a broad sense). The A/D conversion circuit 640 converts the detected peak voltage into digital data. The controller 22 determines the load condition of the power receiving side based on the digital data. For example, the controller determines that the load on the power receiving side is low when the peak voltage (amplitude) is small while the load on the power receiving side is high when the peak voltage (amplitude) is large.

8. Coil Parameter

Figure 15A:
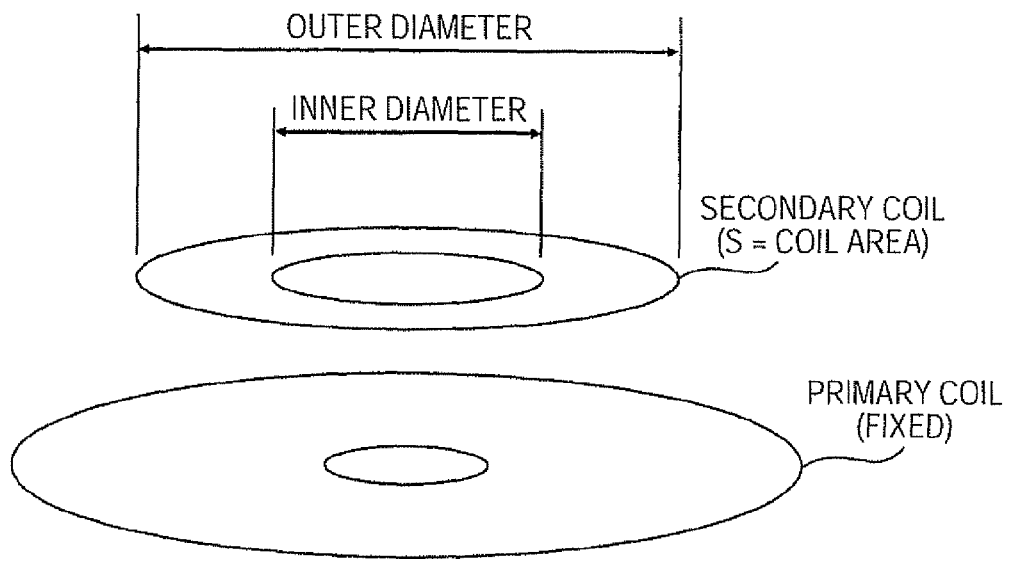
FIGS. 15A and 15B are explanatory views of a coil parameter.

In FIG. 15A, as coil parameters that represents characteristics of a coil includes an inner diameter, an outer diameter, and an area of the coil, for example. Here, a single coil having a fixed coil parameter is prepared as the primary coil and various coils having different coil parameters are prepared as the secondary coil so as to perform a measurement.

Figure 15B:
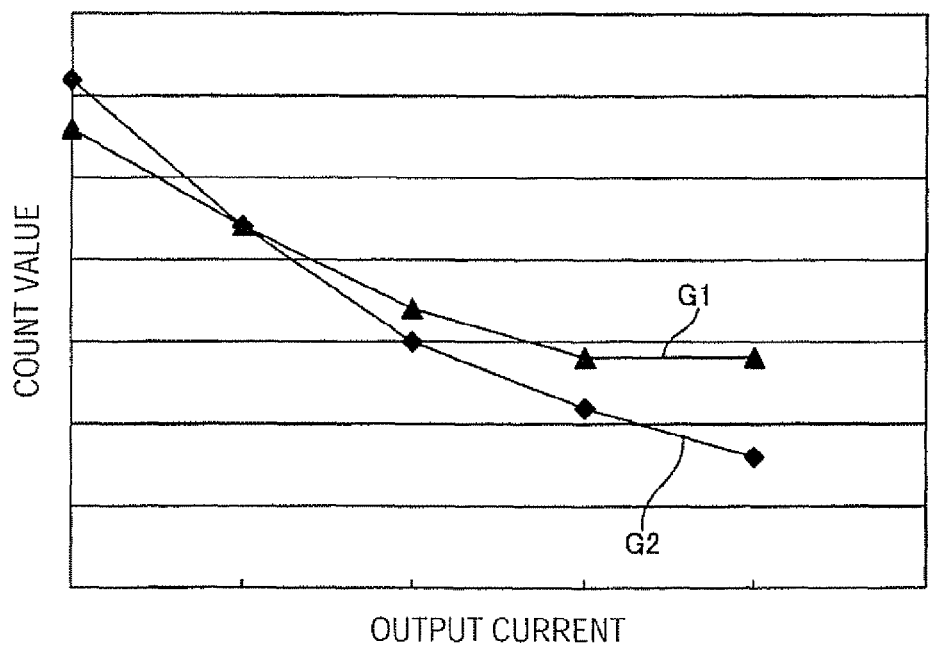
Figure 16A:
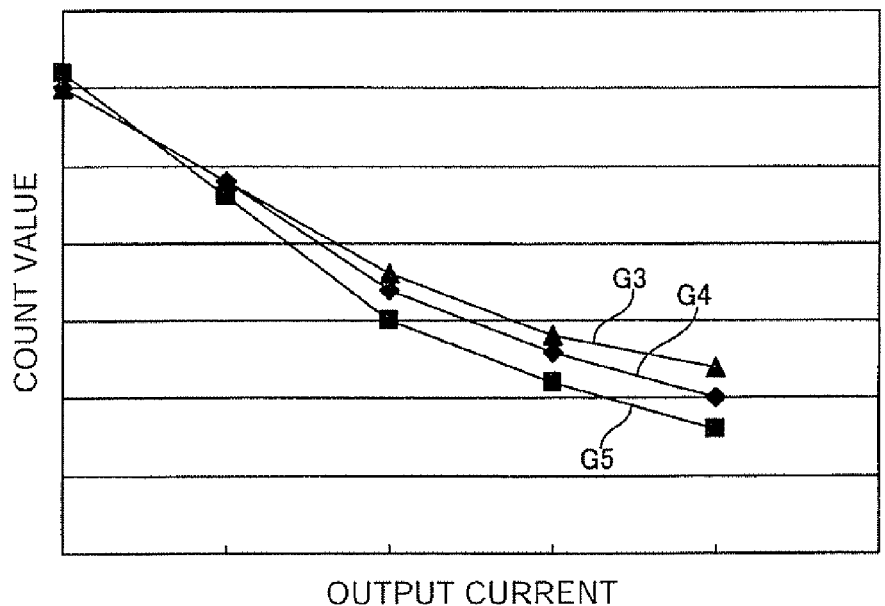
FIGS. 16A and 16B are explanatory views of the coil parameter.

For example, FIG. 15B shows a measured value showing a relation of a count value of pulse width detection and an output current (a load) when the inductance is adjusted so as to have the same output voltage. G1 is a measured value of the secondary coil having a smaller coil area while G2 is a measured value of that having a larger coil area. FIG. 16A shows a measured value showing a relation of a count value of pulse width detection and an output current when the inductance is adjusted by the secondary coils having the same outer diameter. G3 is a measured value of the secondary coil having a smaller coil area, G5 is a measured value of the secondary coil having a larger coil area, and G4 is a measured value of the secondary coil having a medium coil area.

As shown in FIGS. 15B and 16A, a fluctuation range of the count value of pulse width detection to a load fluctuation becomes smaller when the coil area of the secondary coil is small. Accordingly, when a coil area of the secondary coil is changed in accordance with a size and the like of an electronic apparatus, a threshold and the like are set by considering variability characteristics of the count values of FIGS. 15B and 16A.

Figure 16B:
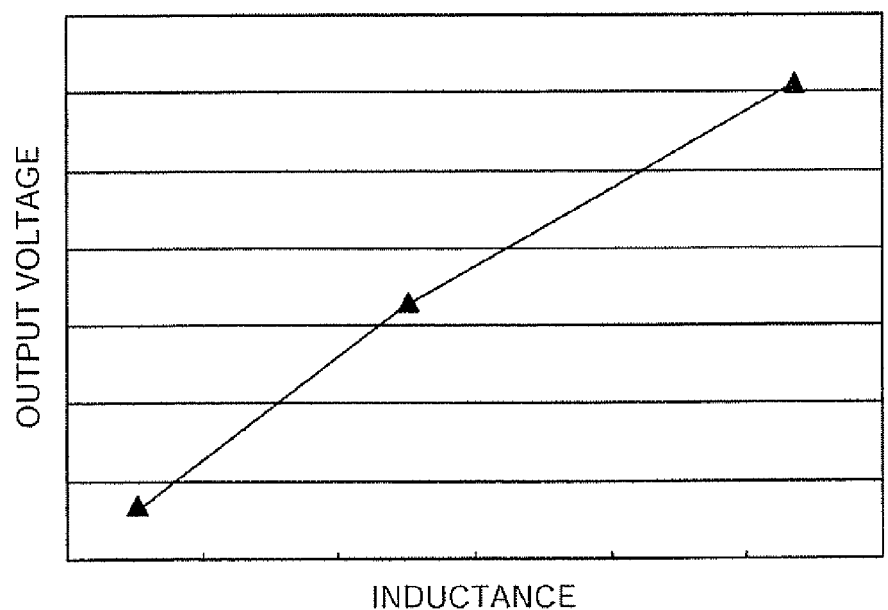

FIG. 16B shows a relation of an inductance and an output voltage with the secondary coils having the same outer diameter. As shown in FIG. 16B, a change in the inductance allows an output voltage (a supply voltage VOUT to a load) to be variously changed, increasing output variations of the coil.

As described above, the characteristics of threshold and output voltage change in accordance with the coil parameter of the secondary coil. As a result, if a plurality of secondary coils having different coil parameters corresponds to a single primary coil, transmitting information such as a threshold and an output voltage corresponding to the coil parameters from the power receiving side to the power transmission side allows optimally adjusted contactless power transmission to be realized.

While the embodiment has been described in detail above, it will be understood by those skilled in the art that a number of modifications can be made to this embodiment without substantially departing from new matters and advantages of this invention. Therefore, it is to be noted that these modifications are all included in the scope of the invention. For example, terms referred to as different terms having broader meanings or having the same definitions of the terms in the specification and drawings can be replaced with the different terms in any part of the specification and drawings. Further, combinations of the embodiment and the modifications can be included in the scope of the invention. Also, the configurations and the operations of the power transmission control device, the power transmission device, the power receiving control device, and the power receiving device, determination method of load conditions using threshold information, the collation method of system information, the method of negotiation setup command process, the detection method of load conditions and the like are not limited to what have been described in the embodiment, and various modifications can be made thereto.

What is claimed is:

1. A power transmission control device included in a contactless power transmission system in which power is transmitted from a power transmission device to a power receiving device by electromagnetically coupling a primary coil and a secondary coil and the power is supplied to a load of the power receiving device, the power transmission control device comprising:

a controller that controls the power transmission control device;

a load condition detection circuit that detects a load condition on a power receiving side; and a storing section storing power transmission side system information that shows a load condition detection method with which the power transmission device is able to cope with the controller collating the power transmission side system information stored in the storing section and power receiving side system information that is received from the power receiving device and shows a load condition detection method that the power receiving device is able to cope, and determining whether or not the power transmission side system information and the power receiving side system information are compatible, the controller determining the load condition on the power receiving side based on threshold information received from the power receiving device and load condition detection information from the load condition detection circuit.

2. The power transmission control device according to claim 1, the controller transmitting the power transmission side system information to the power receiving device if determining that the power transmission side system information and the power receiving side system information are compatible.

3. The power transmission control device according to claim 2, the controller detecting a foreign object before transmitting the power transmission side system information to the power receiving device, and transmitting the power transmission side system information to the power receiving device if the foreign object is not detected.

4. The power transmission control device according to claim 2, the storing section storing a plurality of pieces of the power transmission side system information showing, in a plurality of numbers, the load condition detection method with which the power transmission device is able to cope, and the controller transmitting system information compatible with the power receiving side system information out of the plurality of pieces of the power transmission side system information.

5. The power transmission control device according to claim 1, the controller collating the power transmission side system information and the power receiving side system information before starting normal power transmission from the power transmission device to the power receiving device, and starting the normal power transmission if determining that the power transmission side system information and the power receiving side system information are compatible.

6. A power transmission device, comprising: the power transmission control device according to claim 1, and a power transmission section that generates an alternating-current voltage and supplies the voltage to the primary coil.

7. An electronic apparatus, comprising the power transmission device according to claim 6.

8. A power receiving control device included in a contactless power transmission system in which power is transmitted from a power transmission device to a power receiving device by electromagnetically coupling a primary coil and a secondary coil and the power is supplied to a load of the power receiving device, the power receiving control device comprising:

a controller that controls the power receiving control device; and a storing section that stores threshold information, the controller transmitting the threshold information stored in the storing section to the power transmission device, the storing section storing power receiving side system information showing a load condition detection method with which the power receiving device is able to cope, and the controller transmitting the power receiving side system information to the power transmission device.

9. The power receiving control device according to claim 8, the controller collating the power transmission side system information and the power receiving side system information upon receiving the power transmission side system information transmitted from the power transmission device having received the power receiving side system information, and determining whether or not the power transmission side system information and the power receiving side system information are compatible.

10. The power receiving control device according to claim 8, the storing section storing a plurality of pieces of the power receiving side system information showing, in a plurality of numbers, the load condition detection method that the power receiving device is able to cope with, and the controller transmitting the plurality of pieces of the power receiving side system information to the power transmission device.

11. The power receiving control device according to claim 8, the controller determining whether or not a positional relation between the primary coil and the secondary coil is appropriate, and transmitting the threshold information to the power transmission device if determining that the positional relation is appropriate.

12. The power receiving control device according to claim 8, the controller transmitting the threshold information to the power transmission device before starting normal power transmission from the power transmission device to the power receiving device.

13. The power receiving control device according to claim 12, the controller transmitting the threshold information, and the power receiving side system information that shows the load condition detection method that the power receiving device is able to cope with to the power transmission device before starting the normal power transmission.

14. A power receiving device, comprising:
the power receiving control device according to claim 13; and
a power receiving section converting an induced voltage in the secondary coil into a direct-current voltage.

15. An electronic apparatus, comprising:
the power receiving device according to claim 14; and
a load to which power is supplied by the power receiving device.

* * * * *